(12) United States Patent
Matsuoka et al.

(10) Patent No.: US 6,334,156 B1
(45) Date of Patent: *Dec. 25, 2001

(54) NODE GROUPING METHOD AND DATA TRANSMITTING METHOD IN A NETWORK

(75) Inventors: Hidetoshi Matsuoka; Fumiyasu Hirose; Shintaro Shimogori; Koichiro Takayama, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/531,204

(22) Filed: Sep. 19, 1995

(30) Foreign Application Priority Data

Sep. 19, 1994 (JP) .................................................. 6-223794

(51) Int. Cl.⁷ ...................................................... G06F 15/16
(52) U.S. Cl. .......................... 709/252; 709/238; 709/240; 710/41; 370/351; 370/389
(58) Field of Search ................................. 395/800, 200.1, 395/200.68, 800.01, 861; 370/392, 389, 351; 712/1; 710/41; 709/238, 240, 252

(56) References Cited

U.S. PATENT DOCUMENTS

| | | | |
|---|---|---|---|
| 4,017,840 | * 4/1977 | Schild et al. | 395/491 |
| 4,330,857 | * 5/1982 | Alvarez, III et al. | 370/321 |
| 4,823,111 | * 4/1989 | Tsuchiya et al. | 340/825.05 |
| 5,058,051 | * 10/1991 | Brooks | 711/167 |
| 5,434,977 | * 7/1995 | Zapisek | 395/200 |
| 5,453,978 | * 9/1995 | Sethu et al. | 370/254 |

FOREIGN PATENT DOCUMENTS

| | | |
|---|---|---|
| 5-28122 | 2/1993 | (JP) . |
| 5-342178 | 12/1993 | (JP) . |

* cited by examiner

*Primary Examiner*—John A. Follansbee
(74) *Attorney, Agent, or Firm*—Staas & Halsey LLP

(57) ABSTRACT

All nodes in a network are classified into hierarchical groups. Each node belongs to any group in all hierarchical groups from the highest order group to the lowest order group. The node is assigned a hierarchical address corresponding to each hierarchical group. Thus, the amount of routing information required for data transfer can be reduced, thereby efficiently transmitting data.

14 Claims, 37 Drawing Sheets

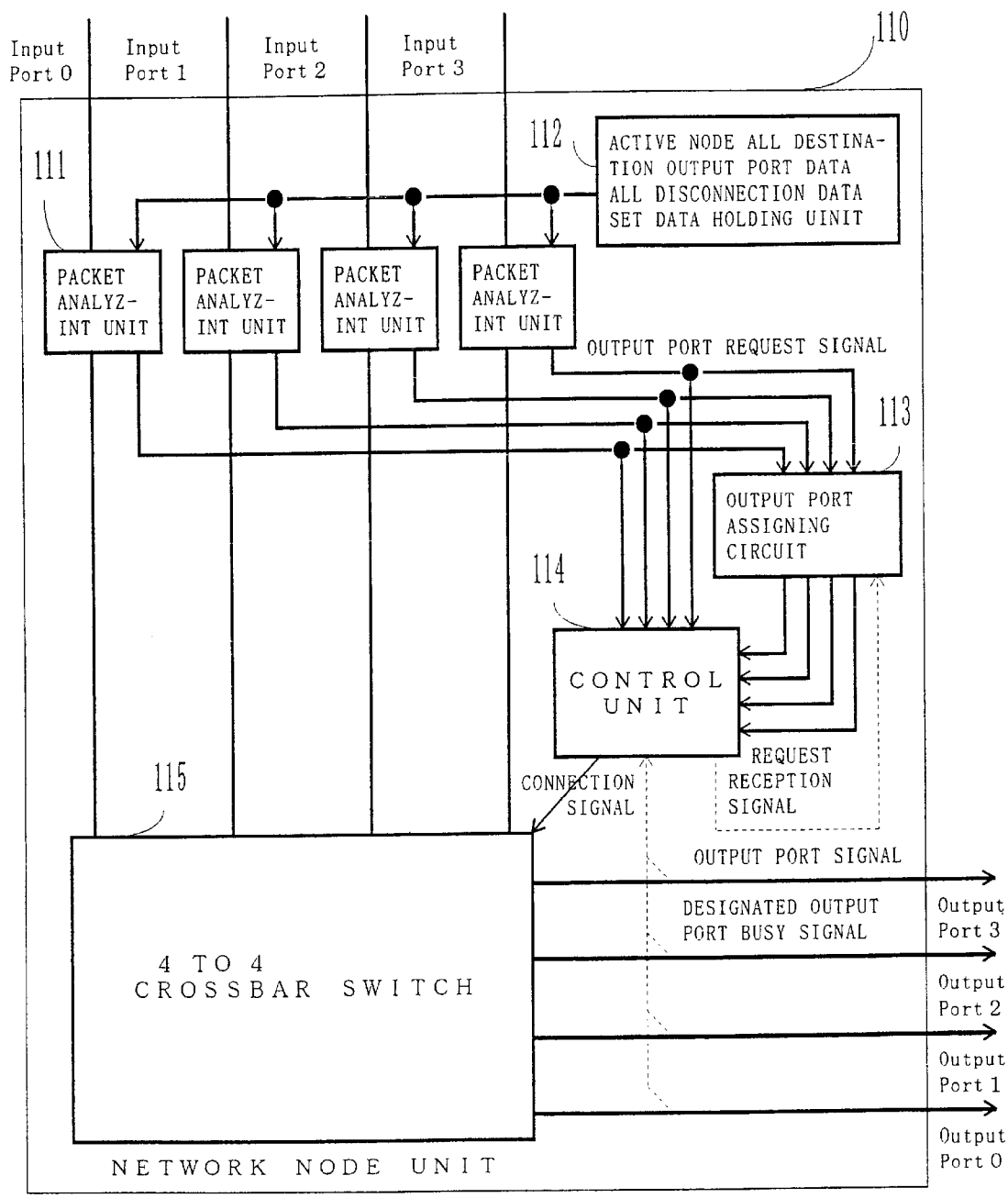
F I G. 7

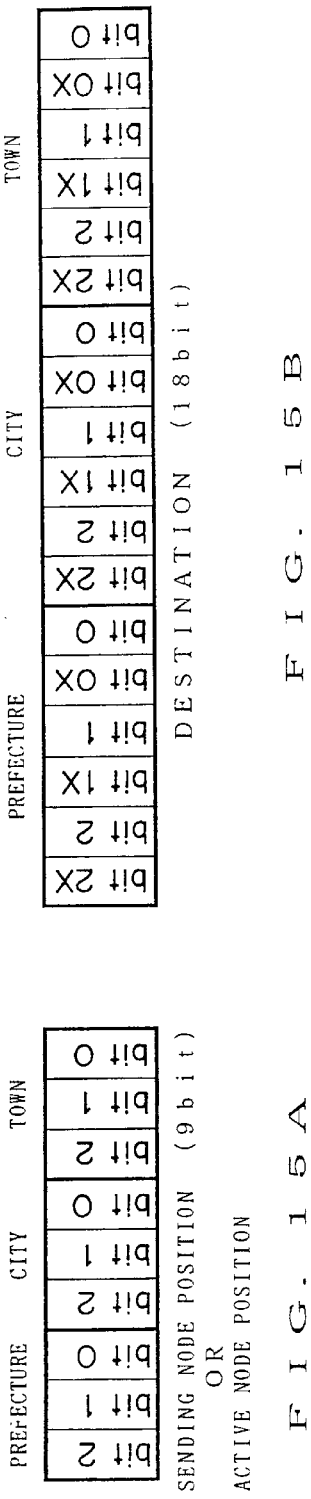
FIG. 15A
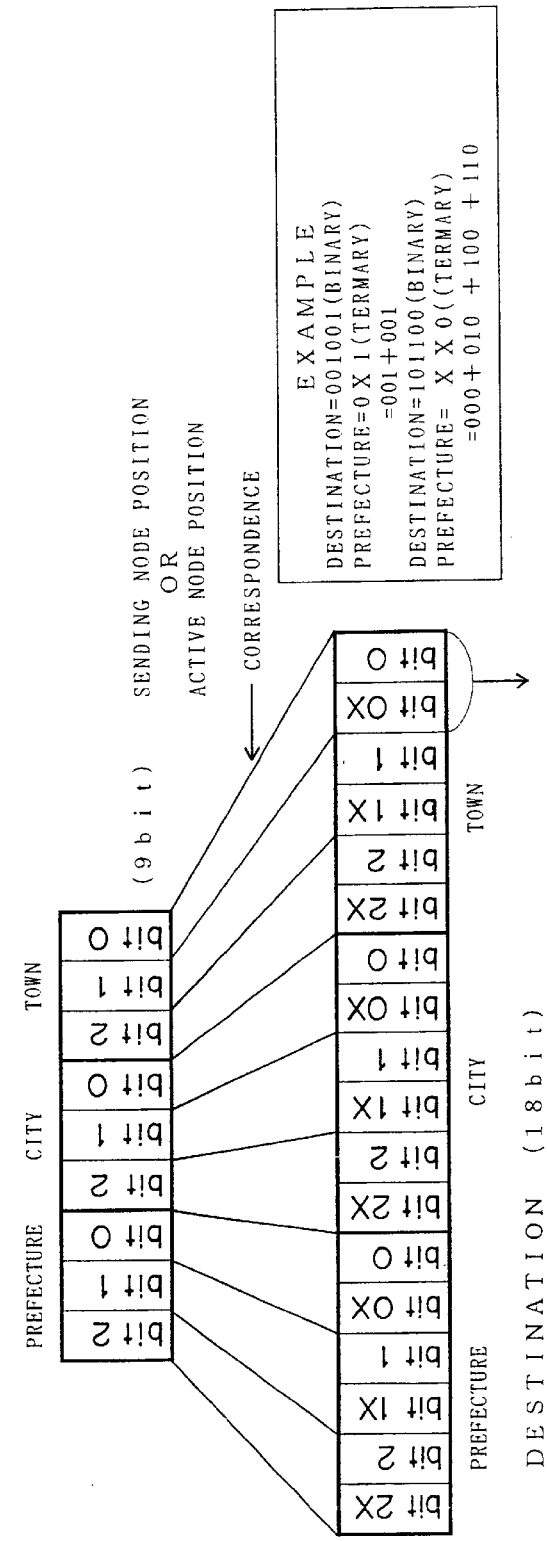
FIG. 15B
FIG. 15C

```
foreach  SENDING NODE (ALL NODES) {
   /*  [ADDING DISCONNECTION MARKS TO ALL PORTS  */
   foreach  OBJECT NODE (ALL NODES) {
      foreach  OBJECT PORTS (ALL PORTS OF OBJECT NODES) {
               ADDING DISCONNECTION MARKS
      }
   }
   /* REMOVING DISCONNECTION MARKS ON ROUTE  */
   foreach DESTINATION NODE (ALL NODE OTHER THAN SENDING NODE) {
      TRANSMITTING PACKETS FROM SENDING NODE TO DESTINATION NODE
      THROUGH ROUTE DEPENDING ON NETWORK DISTRIBUTION INFORMATION,
      AND REMOVING ALL DISCONNECTION MARKS ON ROUTE
   }
   /* REFERRING TO REMAINING DISCONNECTION MARKS AS DISCONNECTION
      INFORMATION  */
   foreach OBJECT NODE (ALL NODES) {
      foreach  OBJECT PORT (ALL PORTS OF OBJECT NODE) {
         if   DISCONNECTION MARKS REMAINING ON OBJECT PORT {
              DISCONNECTION INFORMATION OBTAINED WHEN SENDING
              NODE OF OBJECT PORT REFERS TO POSITION ON SENDING
              NODE IS 1
         }else {
             DISCONNECTION INFORMATION OBTAINED WHEN SENDING NODE OF
             OBJECT PORT REFERS TO POSITION OF SENDING NODE IS 0
         }
      }
   }
}
```

FIG. 21

```
foreach    OBJECT PREFECTURE (ALL PREFECTURES)  {
   SENDING NODE = NODE IN OBJECT PREFECTURE
     /*   ADDING DISCONNECTION MARKS TO ALL PORTS   */
   foreach   OBJECT NODE (ALL NODES)  {
      foreach   OBJECT PORTS (ALL PORTS OF OBJECT NODES) {
            ADDING DISCONNECTION MARKS
      }
   }
   foreach DESTINATION NODE (ALL NODES NOT IN OBJECT PREFECTURE) {
         TRANSMITTING PACKETS FROM SENDING NODE TO DESTINATION
         NODE THROUGH ROUTE DEPENDING ON NETWORK DISTRIBUTION
         INFORMATION, AND REMOVING ALL DISCONNECTION MARKS ON
         ROUTE.
   }
   /* REFERRING TO REMAINING DISCONNECTION MARKS AS DISCONNECTION
      INFORMATION  */
   foreach OBJECT NODE (ALL NODES NOT IN OBJECT PREFECTURE
            INFORMATION)  {
      foreach   OBJECT PORT (ALL PORTS OF OBJECT NODE)  {
         if    (DISCONNECTION MARKS REMAINING ON OBJECT PORT) {
            DISCONNECTION INFORMATION OBTAINED WHEN OBJECT
            PREFECTURE AT OBJECT PORT REFERS TO POSITION OF
            SENDING NODE IS 1
         }else {
            DISCONNECTION INFORMATION OBTAINED WHEN OBJECT
            PREFECTURE AT OBJECT PORT REFERS TO POSITION OF SENDING
            NODE IS 0
         }
      }
   }
}
```

FIG. 22

```
foreach   OBJECT PREFECTURE (ALL PREFECTURES) {
   foreach  OBJECT CITY (ALL CITIES IN OBJECT PREFECTURE) {
   /*     OBJECT PREFECTURE CORRESPONDS TO HIGHER ORDER
          HIERARCHICAL BLOCK */
   /*     OBJECT CITY CORRESPONDS TO LOWER HIERARCHICAL BLOCK */
          SENDING NODE = NODE IN OBJECT CITY
   /*     ADDING DISCONNECTION MARKS TO ALL PORTS */
   foreach  OBJECT NODE (ALL NODES IN OBJECT PREFECTURE) {
      foreach  OBJECT PORTS (ALL PORTS OF OBJECT NODES) {
              ADDING DISCONNECTION MARKS
      }
   }
   foreach DESTINATION NODE (ALL NODES IN OBJECT CITY BUT NOT IN
            OBJECT TOWN) {
      TRANSMITTING PACKETS FROM SENDING NODE TO DESTINATION NODE
      THROUGH ROUTE DEPENDING ON NETWORK DISTRIBUTION INFORMATION,
      AND REMOVING ALL DISCONNECTION MARKS ON ROUTE
   }
   /* REFERRING TO REMAINING DISCONNECTION MARKS AS DISCONNECTION
      INFORMATION   */
   foreach OBJECT NODE (ALL NODES IN OBJECT CITY BUT NOT IN OBJECT
            PREFECTURE) {
      foreach  OBJECT PORT (ALL PORTS OF OBJECT NODE) {
         if    (DISCONNECTION MARKS REMAINING ON OBJECT PORT) {
               DISCONNECTION INFORMATION OBTAINED WHEN OBJECT CITY
               AT OBJECT PORT REFERS TO POSITION OF SENDING NODE
               IS 1
         } else {
               DISCONNECTION INFORMATION OBTAINED WHEN OBJECT CITY AT
               OBJECT PORT REFERS TO POSITION OF SENDING NODE IS 0
         }
      }
     }
    }
   }
  }
```

FIG. 23

```
foreach   OBJECT PREFECTURE (ALL PREFECTURES)  {
   foreach   OBJECT CITY (ALL CITIES IN OBJECT PREFECTURE) {
      foreach  OBJECT TOWN (ALL TOWNS IN OBJECT CITY)  {
         /*  OBJECT CITY CORRESPONDS TO HIGHER ORDER  HIERARCHICAL
            BLOCK */
         /*  OBJECT TOWN CORRESPONDS TO LOWER HIERARCHICAL BLOCK */
         SENDING NODE = NODE IN OBJECT TOWN
         /*  ADDING DISCONNECTION MARKS TO ALL PORTS */
         foreach   OBJECT NODE (ALL NODES IN OBJECT CITY)  {
            foreach OBJECT PORTS (ALL PORTS OF OBJECT NODES)  {
                  ADDING DISCONNECTION MARKS
            }
         }
         foreach DESTINATION NODE (ALL NODES IN OBJECT CITY BUT NOT IN
                  OBJECT TOWN) {
            TRANSMITTING PACKETS FROM SENDING NODE TO DESTINATION NODE
            THROUGH ROUTE DEPENDING ON NETWORK DISTRIBUTION INFORMATION,
            AND REMOVING ALL DISCONNECTION MARKS ON ROUTE
         }
         /* REFERRING TO REMAINING DISCONNECTION MARKS AS DISCONNECTION
            INFORMATION  */
         foreach OBJECT NODE (ALL NODES IN OBJECT CITY BUT NOT IN OBJECT
                  TOWN) {
            foreach    OBJECT PORT (ALL PORTS OF OBJECT NODE) {
               if       (DISCONNECTION MARKS REMAINING ON OBJECT PORT)  {
                        DISCONNECTION INFORMATION OBTAINED WHEN OBJECT
                        PREFECTURE AT OBJECT PORT REFERS TO POSITION OF
                        SENDING NODE IS 1
               } else {
                  DISCONNECTION INFORMATION OBTAINED WHEN OBJECT TOWN AT
                  OBJECT PORT REFERS TO POSITION OF SENDING NODE IS 0
               }
            }
         }
      }
     }
    }
   }
 }
```

FIG. 24

```
foreach OBJECT HIERARCHICAL GROUP (ALL HIERARCHICAL GROUPS LOWER
        THAN HIGHEST ORDER HIERARCHICAL GROUP){
    foreach OBJECT BLOCK (ALL BLOCKS BELONGING TO OBJECT
            HIERARCHICAL GROUP) {
      HIGHER ORDER BLOCK = BLOCK, INCLUDING OBJECT BLOCK, ONE LEVEL
      HIGHER
      SENDING NODE = NODE IN OBJECT BLOCK
      /* ADDING DISCONNECTION MARKS TO ALL PORTS */
      foreach  OBJECT NODE (ALL NODES IN HIGHER ORDER BLOCK)  {
          foreach  OBJECT PORTS (ALL PORTS OF OBJECT NODES)  {
              ADDING DISCONNECTION MARKS
          }
      }
      foreach  DESTINATION NODE (ALL NODES IN HIGHER ORDER BLOCK
              BUT NOT IN OBJECT BLOCK) {
        TRANSMITTING PACKETS FROM SENDING NODE TO DESTINATION NODE
        THROUGH ROUTE DEPENDING ON NETWORK DISTRIBUTION
        INFORMATION, AND REMOVING ALL DISCONNECTION MARKS ON ROUTE
      }
      /* REFERRING TO REMAINING DISCONNECTION MARKS AS
         DISCONNECTION INFORMATION  */
      foreach  OBJECT NODE (ALL NODES IN HIGHER ORDER BLOCK BUT
              NOT IN OBJECT BLOCK) {
        foreach  OBJECT PORT (ALL PORTS OF BLOCK NODE)  {
                if (DISCONNECTION MARK REMAINING ON OBJECT PORT) {
                    DISCONNECTION INFORMATION OBTAINED WHEN OBJECT
                    BLOCK AT OBJECT PORT REFERS TO POSITION OF
                    SENDING NODE IS 1
                } else {
                    DISCONNECTION INFORMATION OBTAINED WHEN OBJECT
                    BLOCK AT OBJECT PORT REFERS TO POSITION OF
                    SENDING NODE IS 0
                }
            }
        }
    }
}
```

FIG. 25

DESTINATION OUTPUT PORT DATA FOR OTHER PREFECTURES

```
if (LENGTH OF ROUTING INFORMATION > 0) {
   RETRIEVING LEADING 2 BITS
   SUBTRACTING 2 FROM LENGTH OF ROUTING INFORMATION if   (LEADING 2-BIT VALUE = 00) then  {
      TRANSFERRING PACKET TO PORT 0
   } else if (LEADING 2-BIT VALUE = 01)  {
      TRANSFERRING PACKET TO PORT 1
   } else if (LEADING 2-BIT = 10)  {
      TRANSFERRING PACKET TO PORT 2
   } else {
      TRANSFERRING PACKET TO PORT 3
   }

} else {
   ACCEPTING PACKET UPON ARRIVAL AT DESTINATION
}
```

FIG. 30

```
if   (LENGTH OF ROUTING INFORMATION > 0)  {
        RETRIEVING LEASING 1 BIT
        SUBTRACTING 1 FROM LENGTH OF ROUTING INFORMATION if   (LEADING 1-BIT VALUE = 0)then   {
        TRANSFERRING PACKET TO PORT 2
   } else {
     TRANSFERRING PACKET TO PORT 1
   }

} else {
   ACCEPTING PACKET UPON ARRIVAL AT DESTINATION
}
```

(a)   PROCESS PERFORMED AT INPUT PORT 0 OF EACH NODE WHEN PACKET IS RECEIVED

```
   if (LENGTH OF ROUTING INFORMATION > 0)  {
      RETRIEVING LEADING 1 BIT
      SUBTRACTING 1 FROM LENGTH OF ROUTNG INFORMATION if (LEADING 1-BIT VALUE = 0)then   {
      TRANSFERRING PACKET TO PORT 0
      } else {
      TRANSFERRING PACKET TO PORT 2
      }

} else {
      ACCEPTING PACKET UPON ARRIVAL AT DESTINATION
   }
```

(b)   PROCESS PERFORMED AT INPUT PORT 1 OF EACH NODE WHEN PACKET IS RECEIVED

```
   if (LENGTH OF ROUTING INFORMATION > 0)  {
      RETRIEVING LEASING 1 BIT
      SUBTRACTING 1 FROM LENGTH OF ROUTING INFORMATION if   (LEADING 1-BIT VALUE = 0)then   {
         TRANSFRRING PACKET TO PORT 1
      } else {
         TRANSFERRING PACKET TO PORT 0
      }
   } else {
        ACCEPTING PACKET UPON ARRIVAL AT DESTINATION
   }
```

(c)   PROCESS PERFORMED AT INPUT PORT 2 OF EACH NODE WHEN PACKET IS RECEIVED

FIG. 31

| | |
|---|---|
| (a,b) | (M0) |
| (A,B) | (0) |
| (B,A) | (1) |

| | |
|---|---|
| (a,b,c) | (M0,M1,M2) |
| (A,B,C) | (0,0,0) |
| (A,C,B) | (0,1,0) |
| (B,A,C) | (0,0,1) |
| (B,C,A) | (1,1,0) |
| (C,A,B) | (0,1,1) |
| (C,B,A) | (1,1,1) |

| (a,b,c,d) | (M0,M1,M2,M3,M4) |
|---|---|
| (A,B,C,D) | (0,0,0,0,1) |
| (A,B,D,C) | (0,1,0,0,1) |
| (A,C,B,D) | (0,0,0,0,0) |
| (A,C,D,B) | (0,0,0,1,0) |
| (A,D,B,C) | (0,1,0,0,0) |
| (A,D,C,B) | (0,0,0,1,1) |
| (B,A,C,D) | (1,0,0,0,1) |
| (B,A,D,C) | (1,1,0,0,1) |
| (B,C,A,D) | (1,0,0,0,0) |
| (B,C,D,A) | (1,0,0,1,0) |
| (B,D,A,C) | (1,1,0,0,0) |
| (B,D,C,A) | (1,0,0,1,1) |
| (C,A,B,D) | (0,0,1,0,0) |
| (C,A,D,B) | (0,0,1,1,0) |
| (C,B,A,D) | (0,0,1,0,1) |
| (C,B,D,A) | (1,0,1,1,0) |
| (C,D,A,B) | (0,0,1,1,1) |
| (C,D,B,A) | (1,0,1,1,1) |
| (D,A,B,C) | (0,1,1,0,0) |
| (D,A,C,B) | (0,1,1,1,0) |
| (D,B,A,C) | (0,1,1,0,1) |
| (D,B,C,A) | (1,1,1,1,0) |
| (D,C,A,B) | (0,1,1,1,1) |
| (D,C,B,A) | (1,1,1,1,1) |

NODE GROUPING METHOD AND DATA TRANSMITTING METHOD IN A NETWORK

BACKGROUND OF THE INVENTION

1. Field of the Invention

The present invention relates to a method of configuring a network used in communications among processes in, for example, a parallel computer system, and more specifically to a node grouping method and data transmitting method in a network for efficiently transmitting data in, for example, an irregular network.

As the scale of networks become larger, the volume of the routing information held by each node for routing the data to be transmitted in a network, that is, the volume of routing data, becomes correspondingly larger. In this situation, a packet transferred between, for example, parallel computers, needs transmission at a high speed even if it is small in size, and it is desirable to have the smallest possible size of routing data when it is added to the packet.

In some methods, a packet is transferred by adding required routing data to the packet for specifying a particular route. In this case, the routing data to be added to the packet should also be of the smallest size possible.

If plural pieces of data are simultaneously input from a plurality of input ports in each node and are to be output from an output port, control to prioritize the output of the input data through an input port, that is, exclusive control, is required. In this case, if only input data from a specific input port is prioritized, there arises a bias in the entire communications. Therefore, technology for realizing control of prioritizing an output from an input port storing input data which has a long output wait time is demanded through the smallest possible circuit.

2. Description of the Related Art

In a communications network between processors in a conventional parallel computer system, a regular topology such as, for example, a torus network, is normally adopted because a destination can be calculated in routing a packet to any destination node without assigning a large volume of destination information to each node when communications are established among nodes forming part of the network. However, since the topology of a network is restricted to a regular format, nodes are connected under tight restrictions, and packets cannot be optionally routed through specific nodes.

With the parallel computer system, the technology disclosed by Tokkaihei-05-028122 is used to broadcast data transfer as a method of simultaneously transmitting the same data to all nodes in a limited area. In this method, broadcast communications can be realized by initially storing transfer control information for data transfer in a plurality of nodes in a network without transferring routing data, etc.

In an inter-computer network such as Internet, an irregular network is normally adopted, and each node stores a large volume of destination information. Unlike telephone lines, a packet should be normally transferred as a plurality of packets and information about packet destinations and transmission routes should be added to the packet.

Furthermore, in a relay node, packets from an input port which should be prioritized, have been determined with the probability that packets are simultaneously input from a plurality of input ports and output to the same output port. The technology disclosed by, for example, Tokkaihei 05-342178, is used to dynamically control the priority order. In this method, packets are assigned priority levels and priority level information is stored for each input port to obtain priority levels using an adder and a comparator.

As described above, the topology should be of a regular type and the number of ports in a node is fixed in the inter-processor network of the conventional parallel computers, thereby causing the problem that a specific part of the network that is congested cannot be exclusively reinforced even if a biased communications pattern is required because, for example, communications concentrate on one part of the network. There arises another problem that the failure of a node also prevents the entire system from working normally.

The conventional technology disclosed by Tokkaihei-05-028122 for realizing the broadcast data transfer needs initially storing transfer control information in a plurality of nodes. Therefore, it is difficult to completely transfer data to an optional combination of destinations, thereby causing the problem that the volume of transfer control information becomes too large. Furthermore, a network such as Internet which stores a large volume of destination data in each node becomes too big for a node of a parallel computer network. If data transfer information is added to a packet itself when broadcast data is transferred, the size of routing data is too large for the data to be transferred, thereby lowering the efficiency of transfer. When the routing information is added to a packet to transfer it through an optional relay node, the size of the added routing information is also relatively large for the data to be transferred. Thus, the efficiency of data transfer is unfavorably lowered.

Additionally, when the priority levels of packets simultaneously entered from one input port and output from one output port are determined, there are too many circuits required to store the priority levels for each input port and to use an adder and comparator for use in dynamically controlling the priority levels.

SUMMARY OF THE INVENTION

The present invention aims at transferring data efficiently by reducing the volume of stored routing information in a network having an irregular topology.

According to the present invention, network nodes are grouped such that nodes forming the network are classified into a plurality of highest-order hierarchical groups in a communicable format only through intra-group nodes, such that nodes in each of the highest-order hierarchical groups are classified into a plurality of second-highest-order hierarchical groups in a communicable format only through intra-group nodes, and such that nodes in each of the higher-order hierarchical groups are classified into a plurality of next-order hierarchical groups in a communicable format only through intra-group nodes. A hierarchical address is added to a node forming the network corresponding to the hierarchical group to which the node belongs.

Thus, the routing information required to transfer data can be reduced and data can be transferred efficiently.

BRIEF DESCRIPTION OF THE DRAWINGS

FIG. 7 shows an example of the detailed configuration of the network node 110 shown in FIG. 6;

FIGS. 15A, 15B, and 15C shows the addresses of each node and of packet destination nodes normally specified plurally;

FIG. 21 shows the procedure of preparing port disconnection information;

FIG. 22 shows the procedure (1) of preparing disconnection information when the port disconnection information is saved;

FIG. 23 shows the procedure (2) of preparing disconnection information when the port disconnection information is saved;

FIG. 24 shows the procedure (3) of preparing disconnection information when the port disconnection information is saved;

FIG. 25 shows the procedure of preparing port disconnection information by shifting object hierarchies;

FIG. 30 shows the procedure of determining the output port of a packet in each node according to the second embodiment;

FIG. 31 shows the procedure of determining the output port when an input packet is not output in the packet input direction;

DESCRIPTION OF THE PREFERRED EMBODIMENTS

Figure 1:
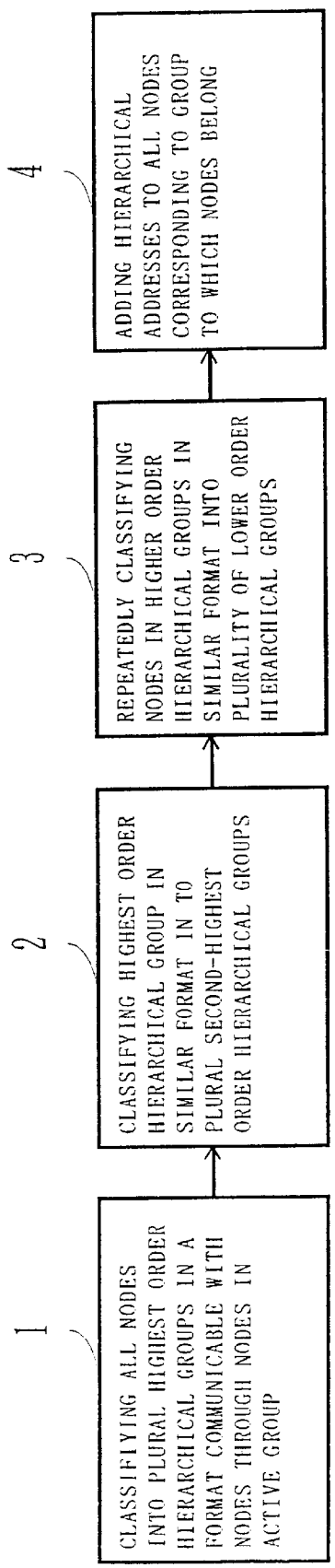
FIG. 1 is a block diagram showing the function of the first embodiment of the present invention.

FIG. 1 is a block diagram showing the functions according to the first embodiment of the present invention. FIG. 1 shows the functions of the method of grouping nodes in the network containing a plurality of nodes, and, for example, having an irregular topology.

In FIG. 1, all nodes forming the network are grouped into a plurality of highest-order hierarchical groups in step 1. In the grouping process, the nodes in each of the resultant groups are grouped such that the communications can be established between nodes through the nodes in the active group.

In step 2, the nodes in each of the highest order hierarchical groups are grouped into a plurality of the second hierarchical groups. Also in this grouping process, the nodes in each of the resultant groups are grouped such that the communications can be established between nodes through the nodes in the active group as described above.

In step 3 as in steps 1 and 2, the nodes in each of the higher order groups are grouped into a plurality of lower order groups under the higher order groups. Also in this grouping process, the nodes in each of the resultant groups are grouped such that the communications can be established between nodes through the nodes in the active group as described above. The operation is repeatedly performed until the nodes in the network are grouped such that, for example, one group contains 2 nodes.

Finally, in step 4, the grouping process terminates with the hierarchical addresses added to all nodes forming the network corresponding to the a hierarchical group to which each node belongs.

According to the first embodiment described later, routing data is stored such that there is the smallest possible volume of routing data required by each node for determining a communications route to an optional destination node in the network, in which all nodes are grouped using the method shown in FIG. 1. That is, each node stores as the minimal destination data the routing data to each group having the highest hierarchical order of addresses different from the highest hierarchical order of addresses in the active node; routing data to each group having the same highest hierarchical order of addresses as the active node and having the second-highest hierarchical order of addresses different from the second-highest hierarchical order of addresses in the active node; the routing data in a similar format; and the routing data to other than the active node, in the group to which the active node belongs in the lowest hierarchical order.

Thus, data can be transferred to a specified node in a different group with the routing data stored in the active node reduced by using the routing data indicating the group of the highest hierarchical group to which the specified group belongs, but to which the active node does not belong.

Figure 2:
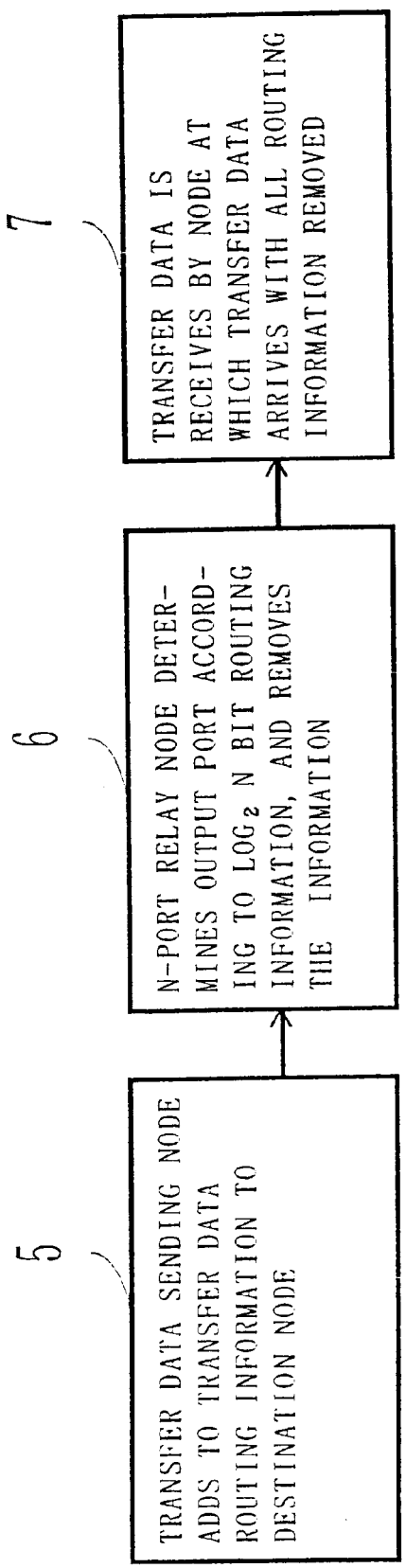
FIG. 2 is a block diagram showing the function of the second embodiment of the present invention.

FIG. 2 is a block diagram showing the function according to the second embodiment of the present invention. FIG. 2 is a block diagram showing the functions of the method of transferring data in a network, in which data is transferred efficiently without storing in a node in the network the routing data for the transfer data, in a network having an irregular topology and containing a plurality of nodes.

In step 5 in FIG. 2, any transfer data sending node in the network adds to the transfer data the routing information to the destination node of the data when data is sent. The routing information is 2-bit data for use in selecting one of four output ports if they are provided for one of the relay nodes of the transfer data. The routing information in the total number of bits used to determine output ports in all relay nodes is added to the transfer data.

When transfer data passes through the relay node having N output ports in step 6, the output port from the relay node is determined using the $\log_2$-N-bit (decimal places are carried) routing information added to the sending node, and the $\log_2$-N-bit information is deleted from the routing information.

Each time the transfer data passes through the relay node, some bits in the routing information added in the sending node are deleted, and the node which receives the transfer data whose routing information has been totally deleted receives the transfer data as the destination node in step 7.

Thus, according to the second embodiment, the node does not store destination information, and a packet can be transferred through an optional route even in a network of an irregular form. In the above described relay node having N output ports, the routing information for use in determining output bits can be saved into $\log_2 (N-1)$ bits (decimal places are carried).

Figure 3:
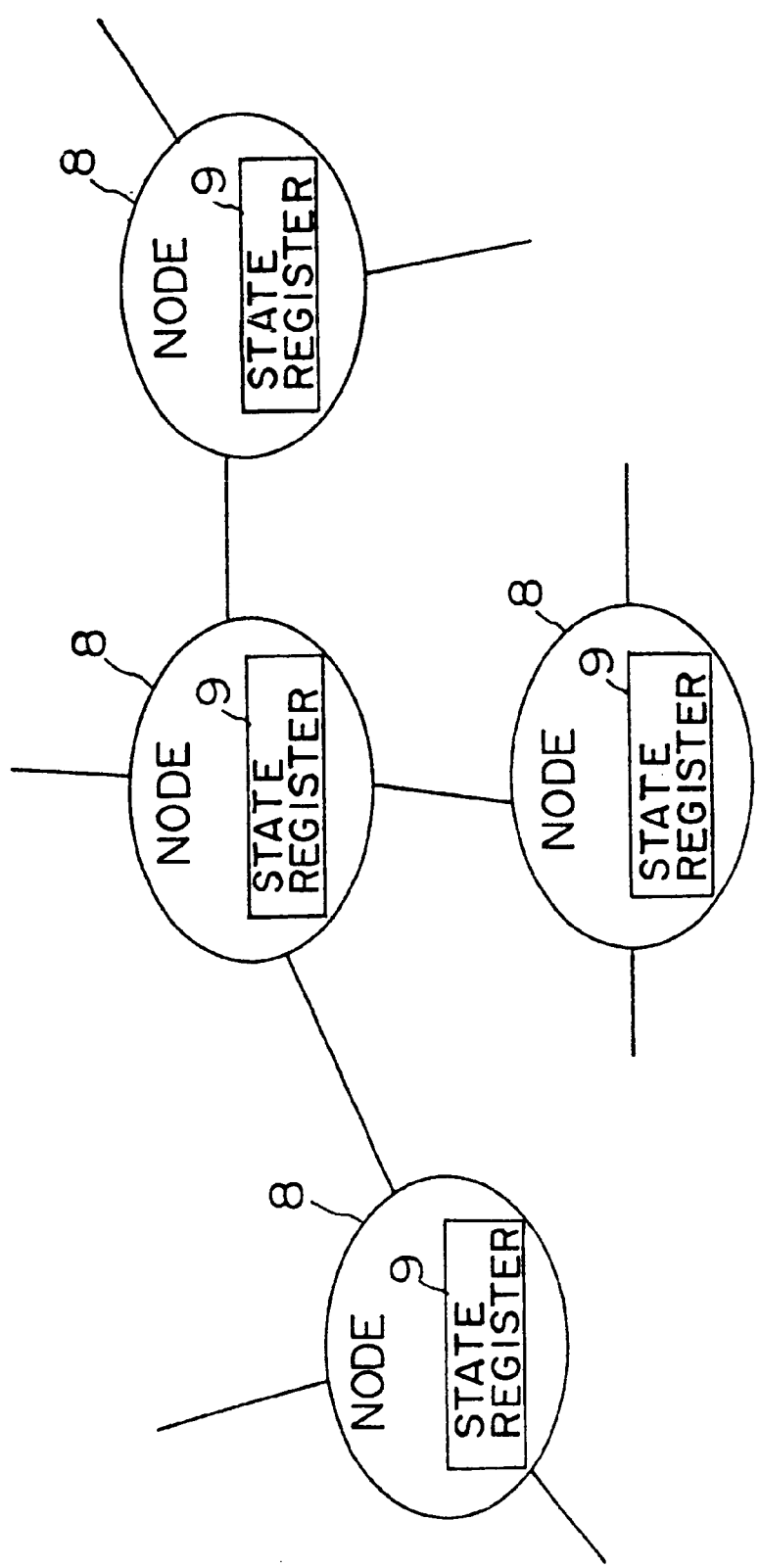
FIG. 3 is a block diagram showing the function of the third embodiment of the present invention.

FIG. 3 is a block diagram showing the configuration according to the third embodiment. In a network comprising a plurality of nodes 8, the priority level of outputting a packet can be enhanced for the input ports waiting their turns to output packets when transfer data, which is simultaneously input through a plurality of input ports of active nodes and output through the same output port, is output. The priority levels can be modified in order from the longest output wait time or can be fixed in an optional order.

In FIG. 3, each of the nodes 8 forming the network comprises a state register 9 of $\log_2 (N!)=M$ bits (decimal places are carried) for storing data corresponding to N! priority levels of inputs through N input ports to determine the priority level of outputting transfer data to be output from the same output port.

According to the third embodiment, each node forming the network further comprises a fixed order output port assigning circuit, a replacing circuit provided before the assigning circuit, and an inversely replacing circuit provided after the assigning circuit, in addition to the above described state register 9. The fixed order output port assigning circuit outputs a request acceptance signal with the output port assignment priority level fixed for an output port through which the transfer data is output in response to the transfer data output request from a plurality of input ports.

The replacing circuit is provided before the assigning circuit and changes the connection state of the input signal line of the transfer data output request signal to the circuit according to the contents of the state register 9. The inversely replacing circuit returns the output of the fixed order output port assigning circuit to the connection state before changing the connection through the replacing circuit to output the above described request acceptance signal to, for example, a control unit for controlling the transfer of packets.

Controlling the contents of the state register 9 using these three circuits enables the priority levels of the input ports to be changed in order from the longest output wait time or enables the priority levels to be fixed in an optional order. Thus, the communications can be prevented from being biased by constantly assigning output ports only to specific input ports, or from being adversely affected, entirely without the need to provide a large scale system including such as an adder and a comparator for dynamically altering the priority levels.

Figure 4:
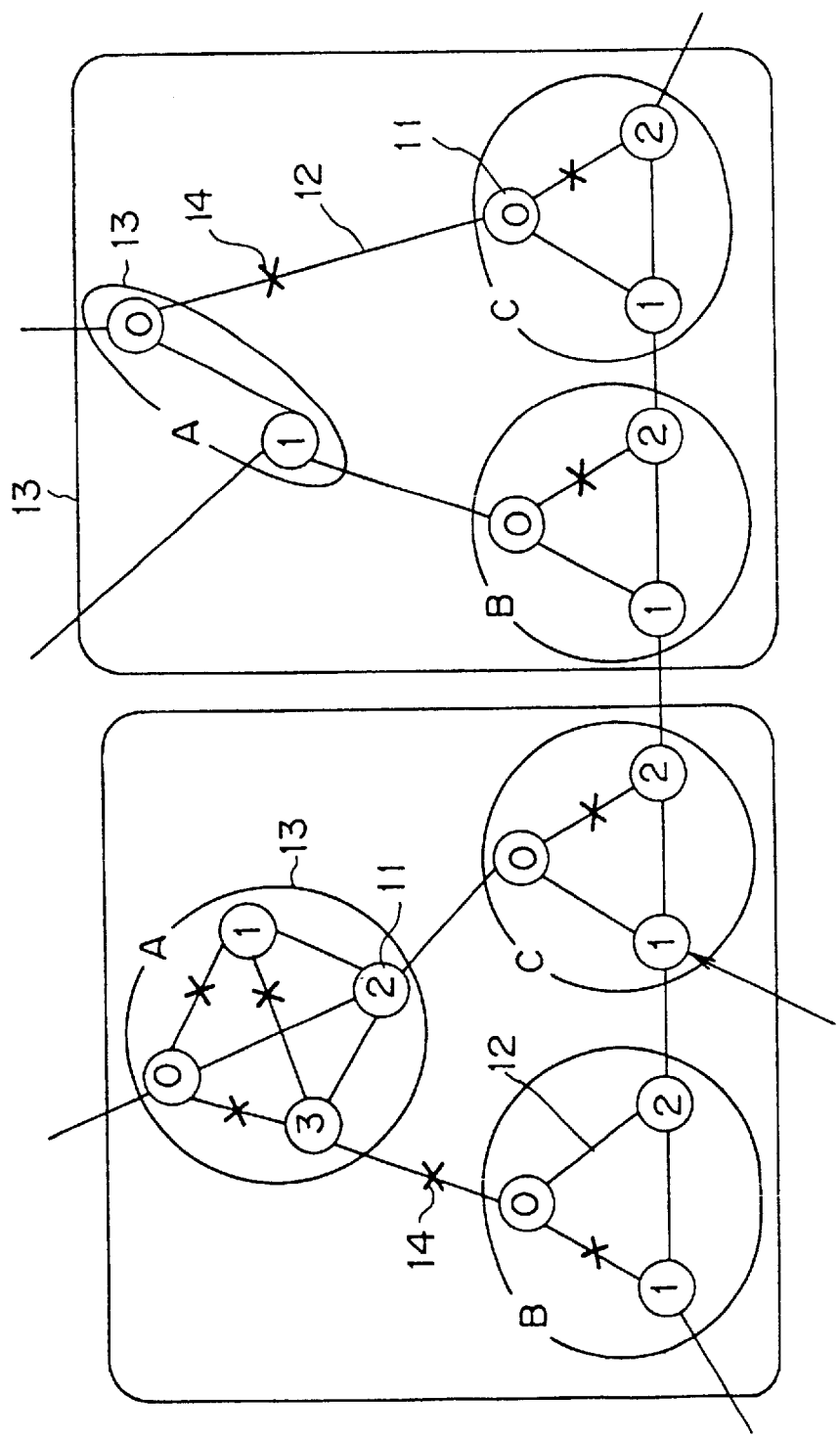
FIG. 4 shows the method of grouping the nodes according to the first embodiment of the present invention.

FIG. 4 shows the method of grouping the nodes according to the first embodiment of the present invention. In FIG. 4, a node 11 represented by an encircled number refers to each node forming part of the network. Each of these nodes are connected to a corresponding processor, etc. and send and receive packets transferred through the network.

A communications line 12 is a bi-directional communications line for connecting the nodes 11. Packets are transferred through the communications lines. A boundary 13 indicates the boundary of the hierarchy of addresses added to each node. A disconnection position 14 refers to the position on the communications line at which a disconnection is made to prevent packets from simultaneously arriving at the same node when a packet is transmitted from the node 11 having an address P-c-1 marked with an arrow to another node 11.

In FIG. 4, each node 11 is assigned a hierarchical address. The highest order hierarchical addresses are classified into two groups P and Q.

The second highest levels of P and Q are classified into three groups a, b, and c. The groups a, b, and c contain two, three, or four nodes 11.

With the network configured as described above, groups belonging to the same hierarchical level can communicate with each other only through nodes in the groups. That is, a hierarchical unit is represented as a node group.

In an irregular network, a large amount of routing data specifying destination nodes is normally stored by each node forming part of the network.

According to the first embodiment of the present invention, communications can be established if each node 11 is provided with the routing data to the highest hierarchical level different from the group of the highest hierarchical order to which the node 11 belongs, also provided with the routing data to each group of the same highest hierarchical order but a different second highest hierarchical order, and provided with the routing data to the group of the lowest hierarchical order. For example, node P-c-1 should be provided only with five pieces of routing data to Q, P-a, P-b, P-c-0, and P-c-2, thereby reducing the amount of routing data to be stored.

In the case shown in FIG. 4, 17 pieces of routing data are conventionally required by 18 nodes. According to the present invention, only 5 pieces of routing data are required because each node is hierarchically grouped.

For example, when data is transmitted from P-c-1 to Q-a-0, the nodes on the route and the routing data provided for the nodes are as follows.

P-c-2
    Q, P-a, P-b, P-c-0, P-c-1
Q-b-1
    P, Q-a, Q-c, Q-b-0, Q-b-2
Q-b-0
    P, Q-a, Q-c, Q-b-1, Q-b-2
Q-a-1
    P, Q-b, Q-c, Q-a-0

When a packet is transferred from P-c-1 to Q-a-0, each node 11 uses the routing data underlined in the above listed routing data. That is, data Q, Q-a, Q-a, Q-a-0 are used. More detailed data is used as the packet gets closer to the destination. When the packet is issued, it is transmitted to corresponding destinations based on non-detailed data.

The contents of each piece correspond to the output direction from each node, that is, to a port number (2-bit representation).

For example, assuming that the output direction ports at the left, center, and right from the node in node P-c-2 are numbered 10, 11, and 01 respectively, and that the disconnection point is the same as that for the node P-c-1, the routing data Q corresponds to the output port number 01. Other routing data P-a, P-b, P-c-0, and P-c-1 correspond to the output port number 10.

The output port from the node P-c-2 is selected according to the 2-bit output port number. The relationship between the routing data and the output port is initially set in the table of each node.

When the packet is to be sent to a plurality of destination nodes in FIG. 4, and it is not provided with the routing information, a plurality of the packets may be transmitted to one node.

For example, when a packet is transmitted to two destinations P-c-2 and P-a-2 from the node P-c-1, the node P-c-0 should relay the packet to the destination P-a-2. However, if it also sends a copy of the packet simultaneously to the destination P-c-2, two packets are received by the node P-c-2.

According to the first embodiment, specifying a communications line which prohibits the passage of a packet in the network depending on the position of the packet sending node, that is, logically disconnecting the communications line, prevents the copies of the same packet from being received by one node.

For example, when the node P-c-1 is a packet sending node in FIG. 4, the disconnection position 14 specifies the communications line which prohibits the passage of the packet in the network. Each of the nodes 11 forming the network stores, corresponding the packet sending node, the number of the port connected to the communications line which is not allowed to pass the package as the disconnection information about the communications line.

As the amount of routing data for the above described destination node is reduced, so the amount of the disconnection information to be stored can be reduced depending on which group the sending node belongs to. For example, the disconnection information to be stored by the node P-c-1 is limited to the five addresses of the sending nodes Q, P-a, P-b, P-c-0, and P-c-2.

Thus, according to the first embodiment, placing restrictions on the form of the network allows an output port, that is, the destination of the packet, to be determined according to the position of the packet sending node and a small amount of routing data, and also realizes the transmission of the packet to the optional combination of destinations. As compared with the method disclosed by the above described Tokkaihei 5-028122, some communications lines sometimes cannot be used depending on the form of a network. However, an output port of the active node from which the packet is dynamically output can be calculated according to the position of the packet sending node, thereby reducing the amount of the routing data to be stored by the node.

There are generally two methods of configuring the nodes shown in FIG. 4.

One is to directly connect the signal line of a network to the processor. This method is used for a LAN comprising workstations and personal computers.

The other is to connect an element, provided exclusively for the network in addition to the processor, to the signal line of the network. In this case, the exclusive element controls the communications (packet transfer control). In this case, the exclusive element is not very large, and it can be configured compactly according to the present invention.

Other applicable methods provide another processor for functioning as the above described exclusive element. Using any method, the present invention can be applied effectively.

When the present invention is applied to any of the above described methods, the detailed configuration of each node is different among the methods. According to the present embodiment, a network exclusive element is provided in addition to the above described processor. Described below is an example of the detailed configuration. Obviously the detailed configuration is an example, and each component can be realized by other structures or software.

Figure 5:
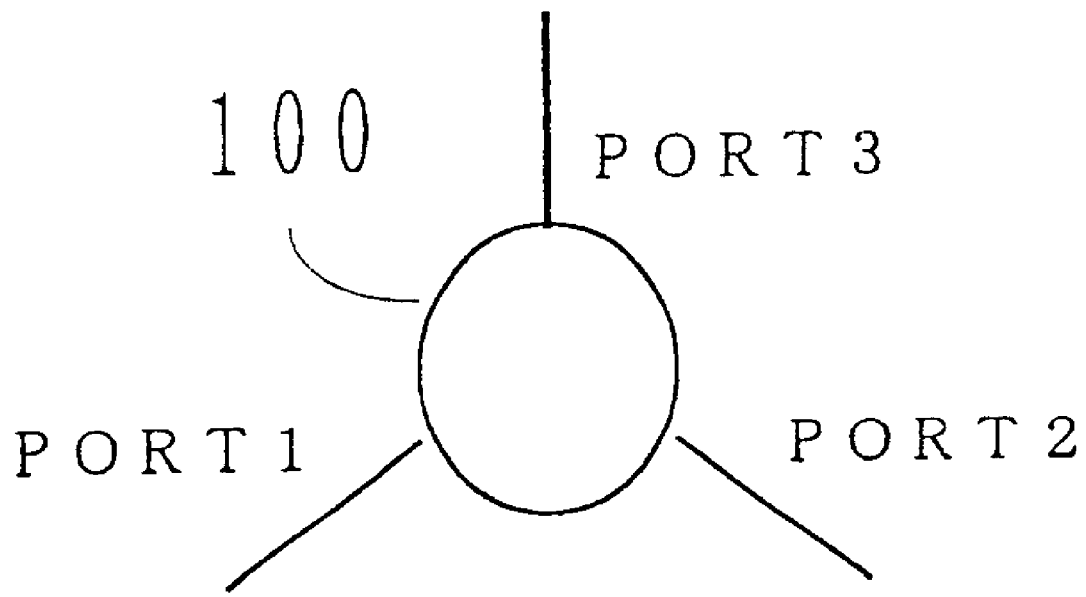
FIG. 5 shows the concept of the network nodes having processors and exclusive elements.

FIG. 5 shows the configuration of the network node having a processor and an exclusive element. In FIG. 5, a network node 100 comprises, for example, three ports (port 1 through port 3).

Figure 6:
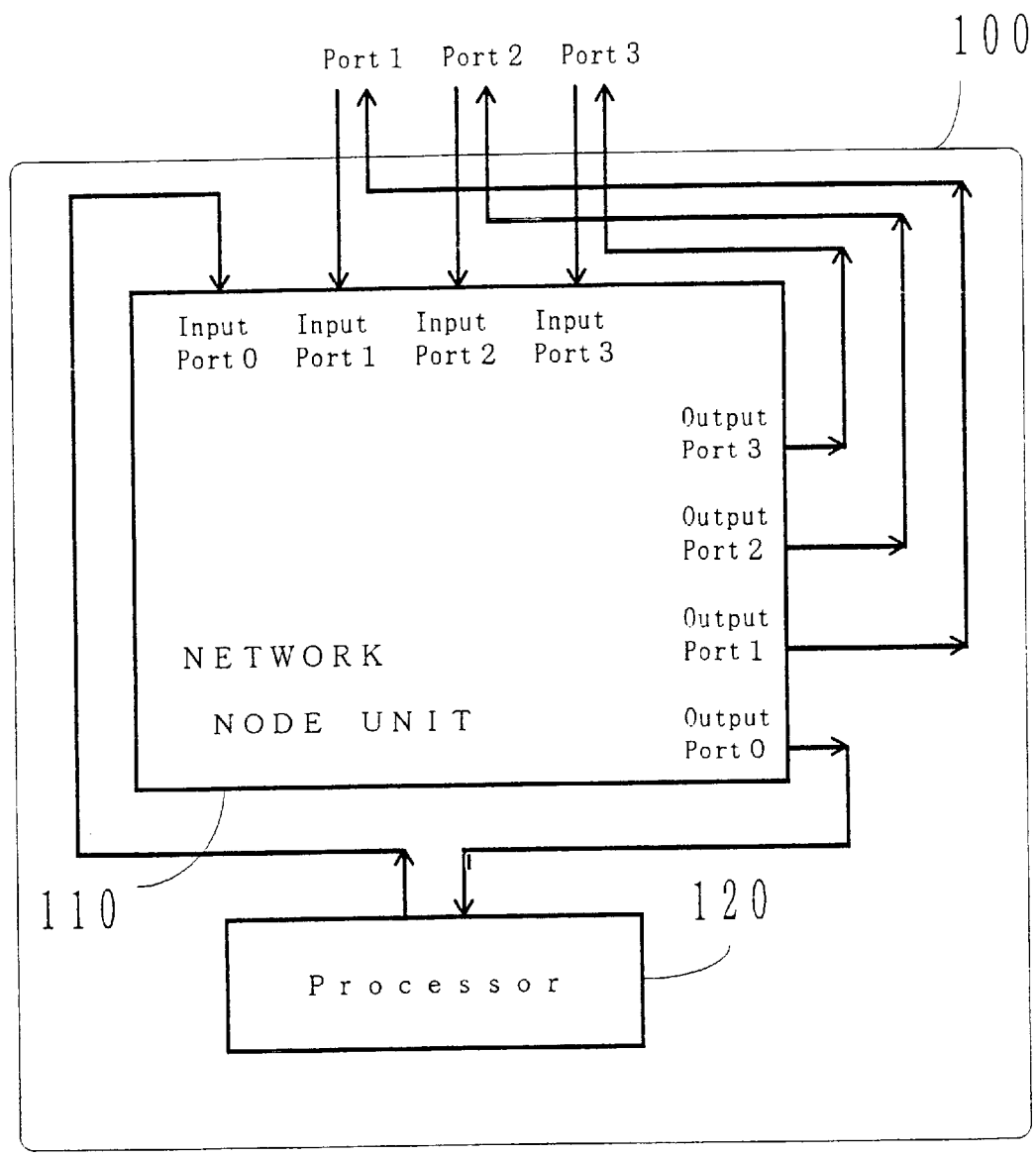
FIG. 6 shows an example of the detailed configuration of network nodes having processors and exclusive elements shown in FIG. 5.

FIG. 6 shows an example of the detailed configuration of the network node 100 comprising the processor and exclusive element shown in FIG. 5. In FIG. 6, the network node 100 comprises a network node unit 110 and a processor 120.

The network node unit 110 is an exclusive element for controlling the communications and is connected to the signal line of the network. The network node unit 110 comprises input ports (input port 1 through input port 3) for receiving signals input through the ports (port 1 through port 3) shown in FIG. 5. It also comprises output ports (output port 1 through output port 3) for outputting signals to each of the above described ports. Furthermore, it comprises input port 0 and output port 0 for receiving and outputting data from and to the processor 120.

FIG. 7 shows an example of the detailed configuration of the network node unit 110 shown in FIG. 6. In FIG. 7, the network node unit 110 comprises packet analyzing units 111, a set data holding unit 112, an output port assigning circuit 113, control unit 114, and 4-to-4 cross bar switch 115.

The packet analyzing units 111 receive a packet input through each of the input ports, data held by the set data holding unit 112, that is, active node data, all destination output port data, and all disconnection data, and outputs an output port request signal to the output port assigning circuit 113 and control unit 114. After temporarily storing the signals received through the above described input ports, it outputs them to the 4-to-4 cross bar switch 115.

Figure 32:
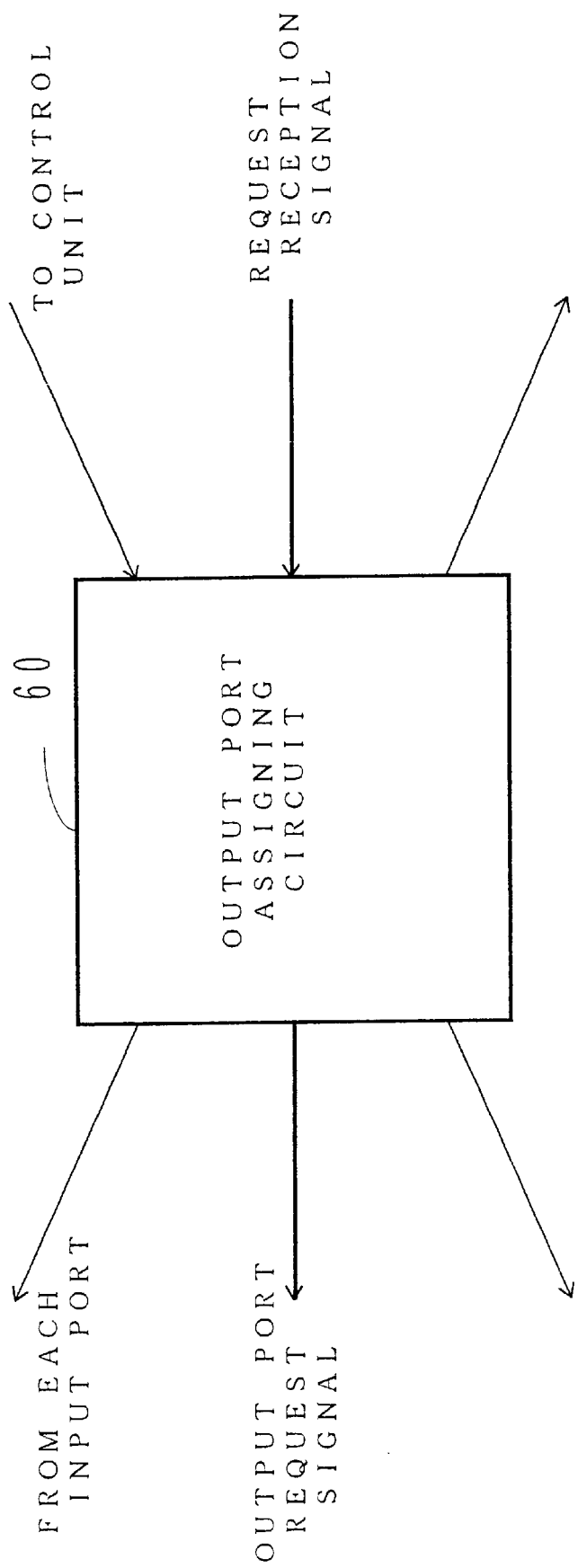
FIG. 32 shows the method of assigning an output port to each input port according to the third embodiment.

The output port assigning circuit 113 receives an output port busy signal from the control unit 114 as well as the above described output port request signal, and outputs a request reception signal to the control unit 114. An example of the detailed configuration and operations of the output port assigning circuit 113 are explained as the third embodiment of the present invention by referring to FIG. 32 and succeeding figures.

The control unit 114 receives the output port request signal and request reception signal. Thus, the connection between the output port and the input port is determined and a connection signal is issued to the 4-to-4 cross bar switch 115.

According to the connection signal, the 4-to-4 cross bar switch 115 switches the packet received through an input port to a corresponding output port. If the input port of another node to which the output port is connected is busy, then the output port busy signal is provided for the control unit 114 as shown in FIG. 7, and the transfer is suspended. Data is controlled between transmission and suspension by storing the connection during the passage of the packet and disconnecting the packet after detecting the end of the packet.

Figure 8:
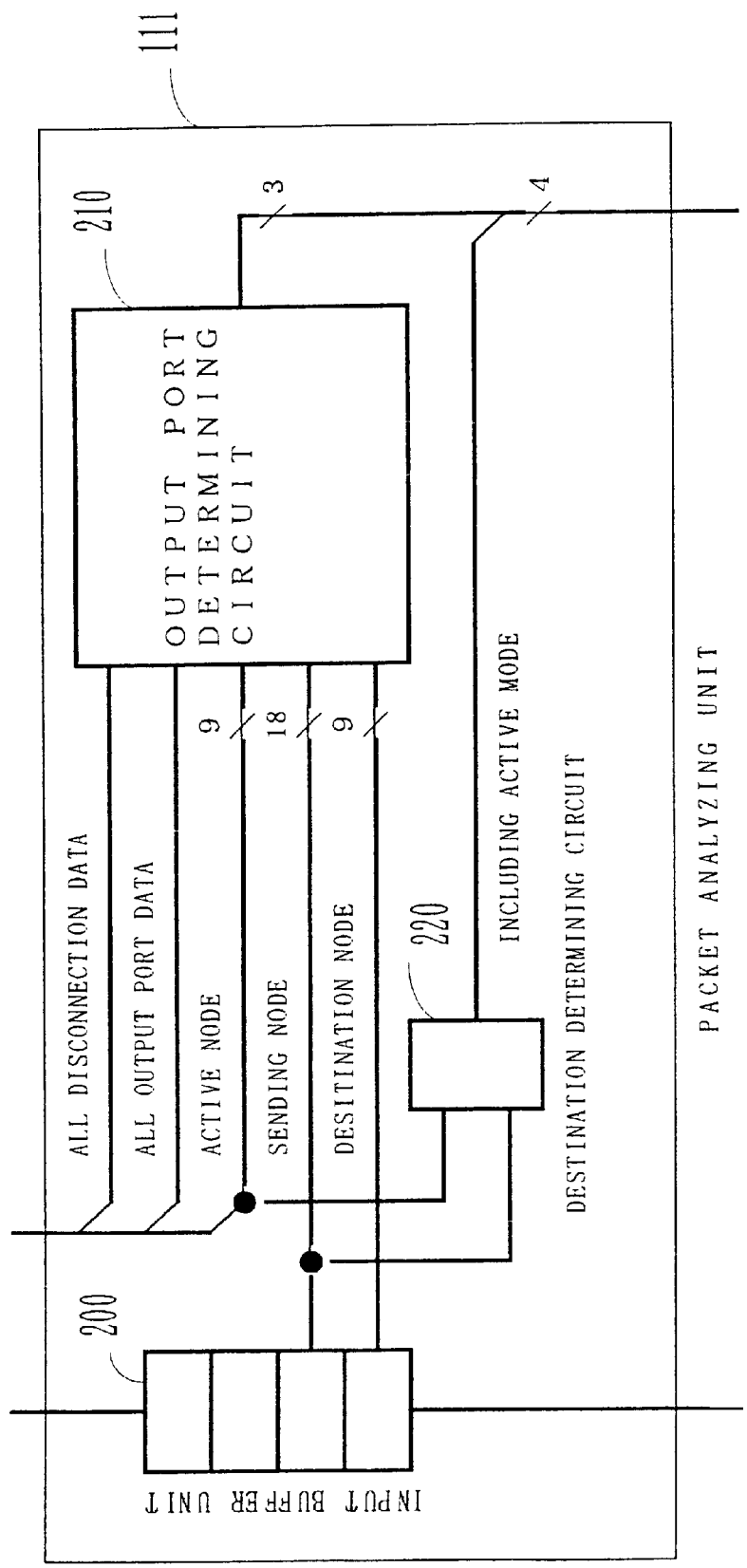
FIG. 8 shows an example of the configuration corresponding to the embodiment 1 of the packet control unit shown in FIG. 7.

FIG. 8 shows an example of the configuration according to the first embodiment of the packet control unit shown in FIG. 7. In FIG. 8, a packet analyzing unit 111 comprises an input buffer unit 200, output port determining circuit 210, and destination determining circuit 220.

The input buffer unit 200 temporarily stores the data in the packet received through the input port, detects the portions referred to as a source node and a destination node, and outputs the data to the output port determining circuit 210 and destination determining circuit 220.

The output port determining circuit 210 receives all disconnection data, all input port data, and active node data from the set data holding unit as well as the source node and destination node, and outputs a 3-bit output port request signal corresponding to the three ports. The detailed configuration and operations of the output port determining circuit 210, all disconnection data, all input port data, active node, etc. are explained by referring to FIG. 16 and the succeeding figures.

The destination determining circuit 220 receives the active and destination node data and outputs a signal indicating "containing the active node" as a part of the output port request signal. Another destination determining circuit is provided in the output port determining circuit and explained later in detail by referring to FIGS. 16, 17, etc.

The configuration excluding the destination determining circuit 220 can be effective in addition to the configuration of the packet analyzing unit shown in FIG. 8. In this case, another destination determining circuit in the output port determining circuit 210 can be modified to generate a signal in the active node so that the signal can be induced therefrom.

Figure 9:
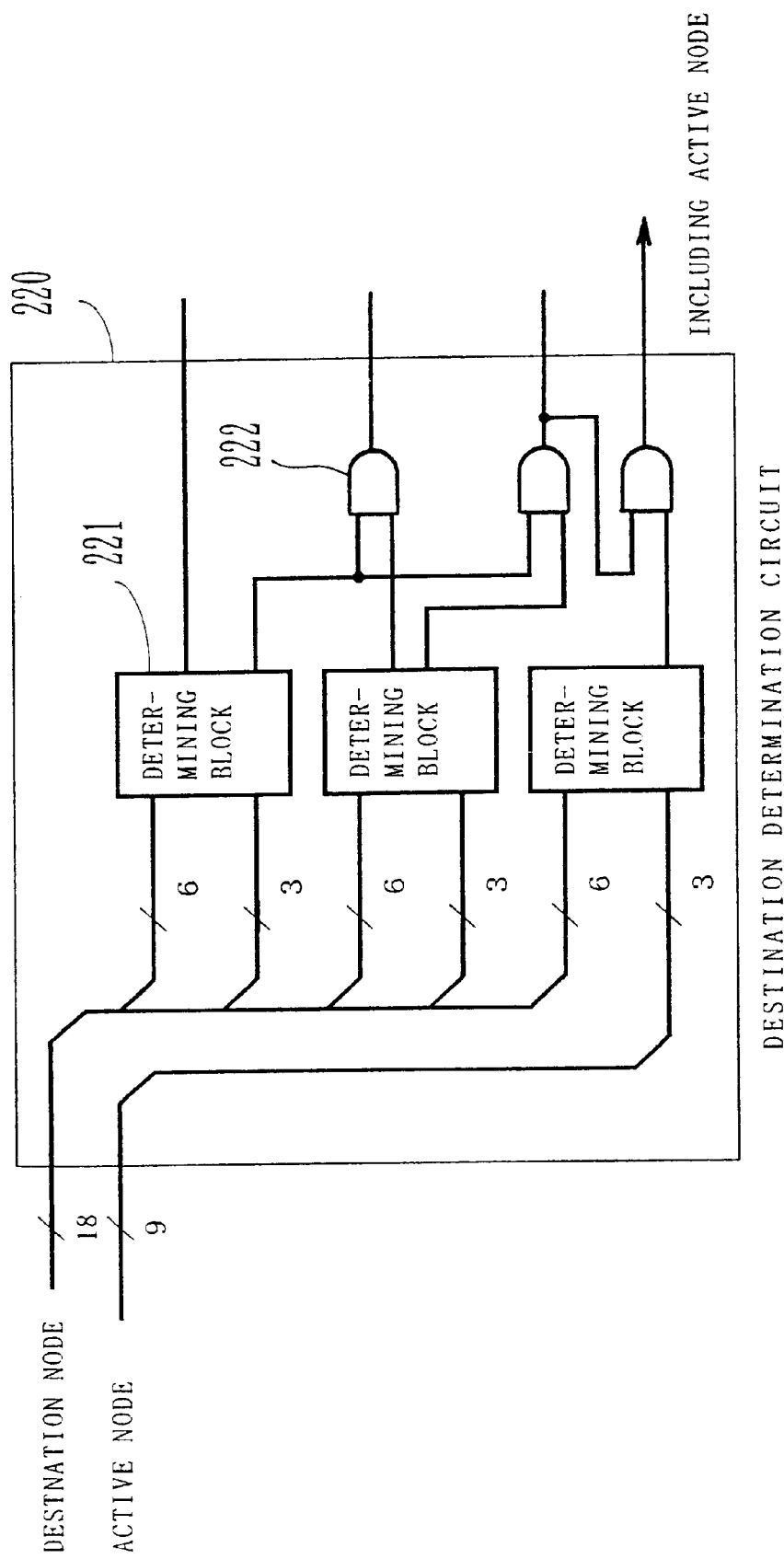
FIG. 9 shows an example of the configuration of the destination determining circuit.

FIG. 9 shows an example of the configuration of the destination determining circuit 220.

In FIG. 9, the destination determining circuit 220 comprises determining blocks 221 and AND gates 222. The detailed configuration of the determining block 221 can be the same as that shown in FIG. 17B.

Described below is the flowchart showing the operation performed when a packet is input to each input port of each node when broadcast data is transferred with the communications line which is not allowed to pass packets in the network logically disconnected.

Figure 10:
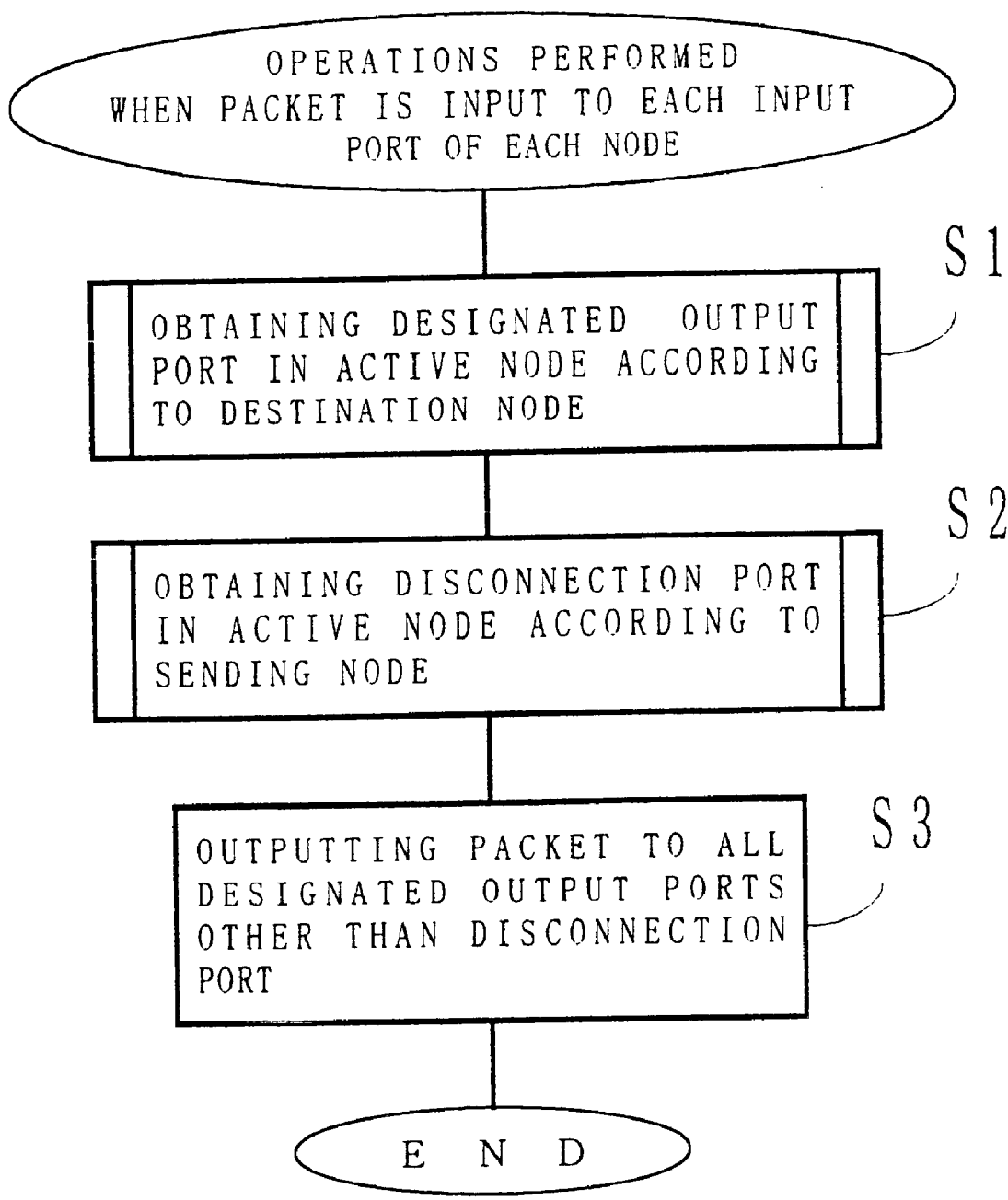
FIG. 10 is a flowchart showing the operation when a packet is input to each input port of each node.

FIG. 10 is a flowchart showing the operation performed when a packet is input to each input port of each node.

First, a designated port in the active node is obtained from the destination node contained in the input packet (S1). Then, the disconnection port in the active node is obtained from the source node contained in the input packet (S2). Finally, according to the results in S1 and S2, the packet is output to all ports which are designated output ports and non-disconnection ports (S3). The port disconnection information is not generated by a node, but generated by following the procedure shown in FIGS. 21 through 25 in the computer depending on the connection state in the network. The generated port disconnection information is used by each node.

Figure 11:
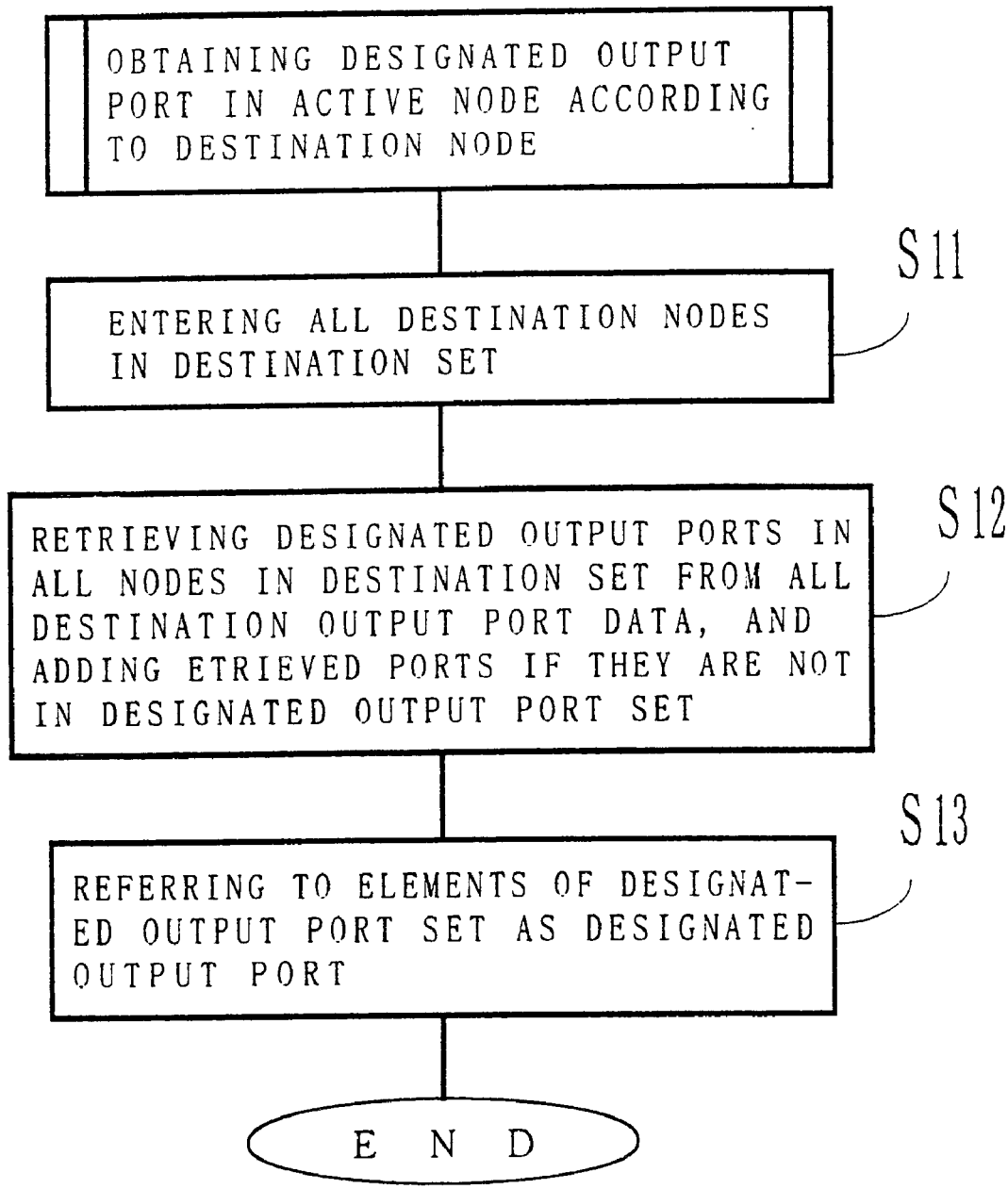
FIG. 11 is a flowchart showing the detailed operation in S1 shown in FIG. 10 when non-hierarchical destination data is used.

FIG. 11 is a flowchart showing the detailed operation in step S1 in FIG. 10 performed when non-hierarchical destination data is used.

In FIG. 11, all nodes defined as the destinations are put in a destination set (S11).

Then, the designated output ports of all nodes in the destination set are retrieved from all destination output port data. The retrieved ports are put in the designated output port set if they have not been entered there (S12). The elements in the designated output port set are defined as designated output ports (S13).

Figure 12:
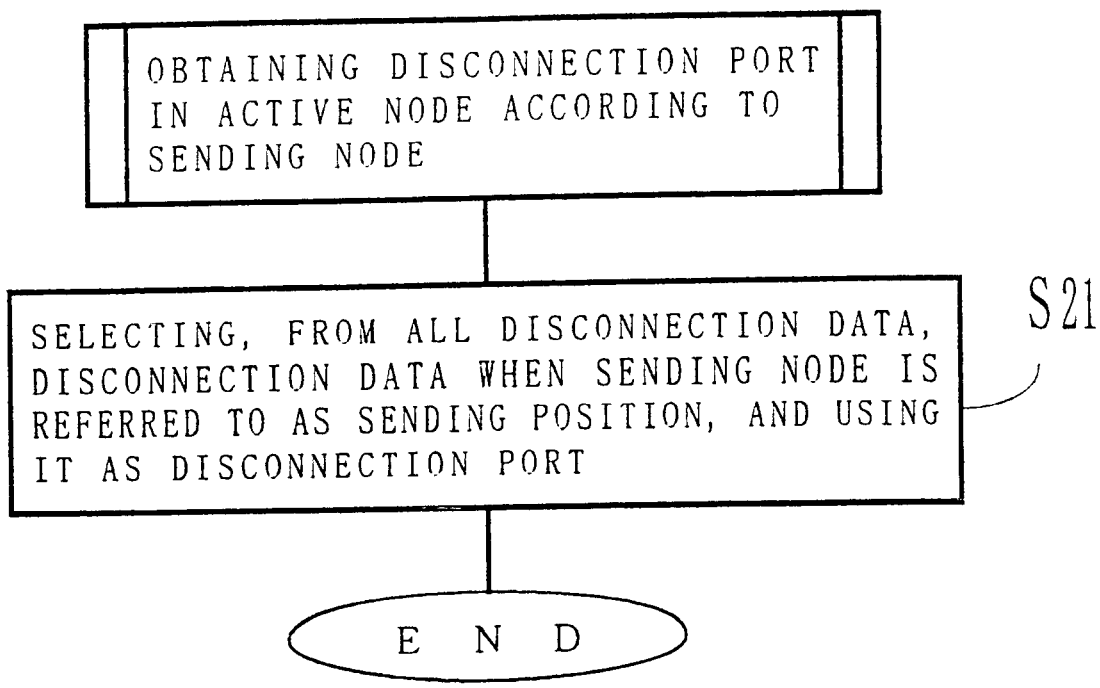
FIG. 12 is a flowchart showing the detailed operation in S2 shown in FIG. 10 when non-hierarchical disconnection data is used.

FIG. 12 is a flowchart showing the detailed operation in step S2 in FIG. 11 performed when non-hierarchical destination data is used. In this operation, a disconnection port is obtained in the circuit described later and shown in FIG. 16.

In FIG. 12, when a disconnection port is obtained from the source node, the disconnection data is selected as a disconnection port with the source node in all disconnection data defined as the source point.

Figure 13:
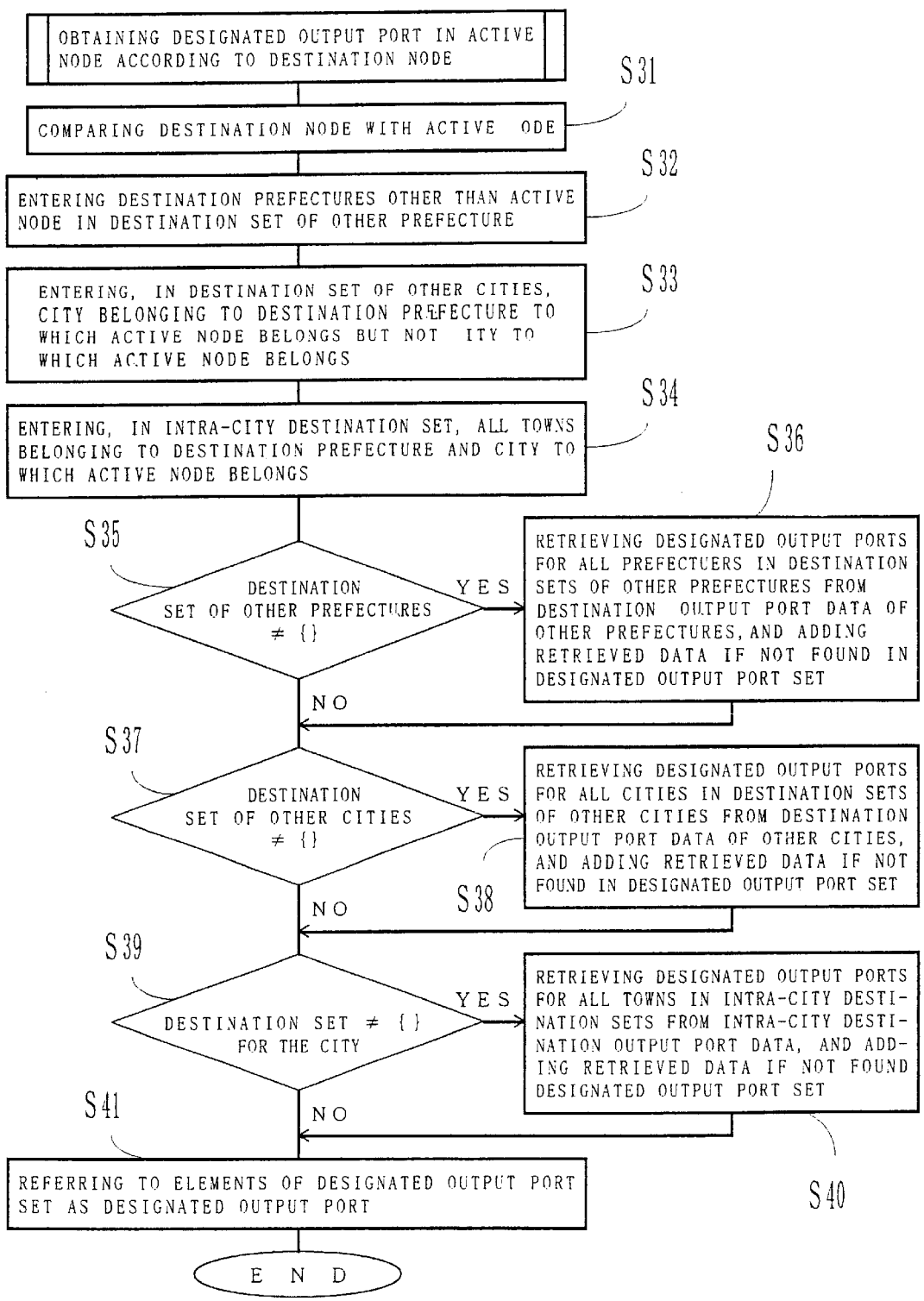
FIG. 13 is a flowchart showing the detailed operation in S1 shown in FIG. 10 when hierarchically stored destination data is used.

FIG. 13 is a flowchart showing the detailed operation in step S1 in FIG. 10 performed when hierarchically stored destination data is used. As an example of the embodiments of the present invention, the hierarchical destination data is grouped into the prefecture data as the highest hierarchical order data; the city data as the second highest hierarchical order data; and the town data as the lowest hierarchical order data, that is, each node refers to a town. The grouped data is used when a designated output port is obtained by the circuit described later and shown in FIGS. 16 and 19.

In FIG. 13, the destination node is compared with the active node (S31). Then, the prefecture data is put in a destination set for other prefectures if the destination node indicates other than the active node (S32). Next, the city data is put in a destination set for other cities if the destination node indicates the same prefecture but other than the active node (S33). Then, the town data is put in a local destination set if the destination node indicates the same prefecture and city as the active node (S34).

It is determined whether or not the destination set for other prefectures≠{ } (S35). If "yes", that is, if more than one prefecture is contained in a destination set for other prefectures, the designated output ports in all prefectures contained in the destination set for other prefectures are retrieved and entered to the designated output port set if they have not been entered there (S36).

Similarly, it is determined whether or not the destination set for other cities≠{ } (S37). If "yes", the designated output ports in all cities contained in the destination set for other cities are retrieved and entered to the designated output port set if they have not been entered there (S38).

Similarly, it is determined whether or not the local destination set≠{ } (S39). If "yes", the designated output ports in all towns contained in the local destination set are retrieved and entered to the designated output port set if they have not been entered there (S40).

Finally, an element in the designated output port set is defined as a designated output port (S41).

Figure 14:
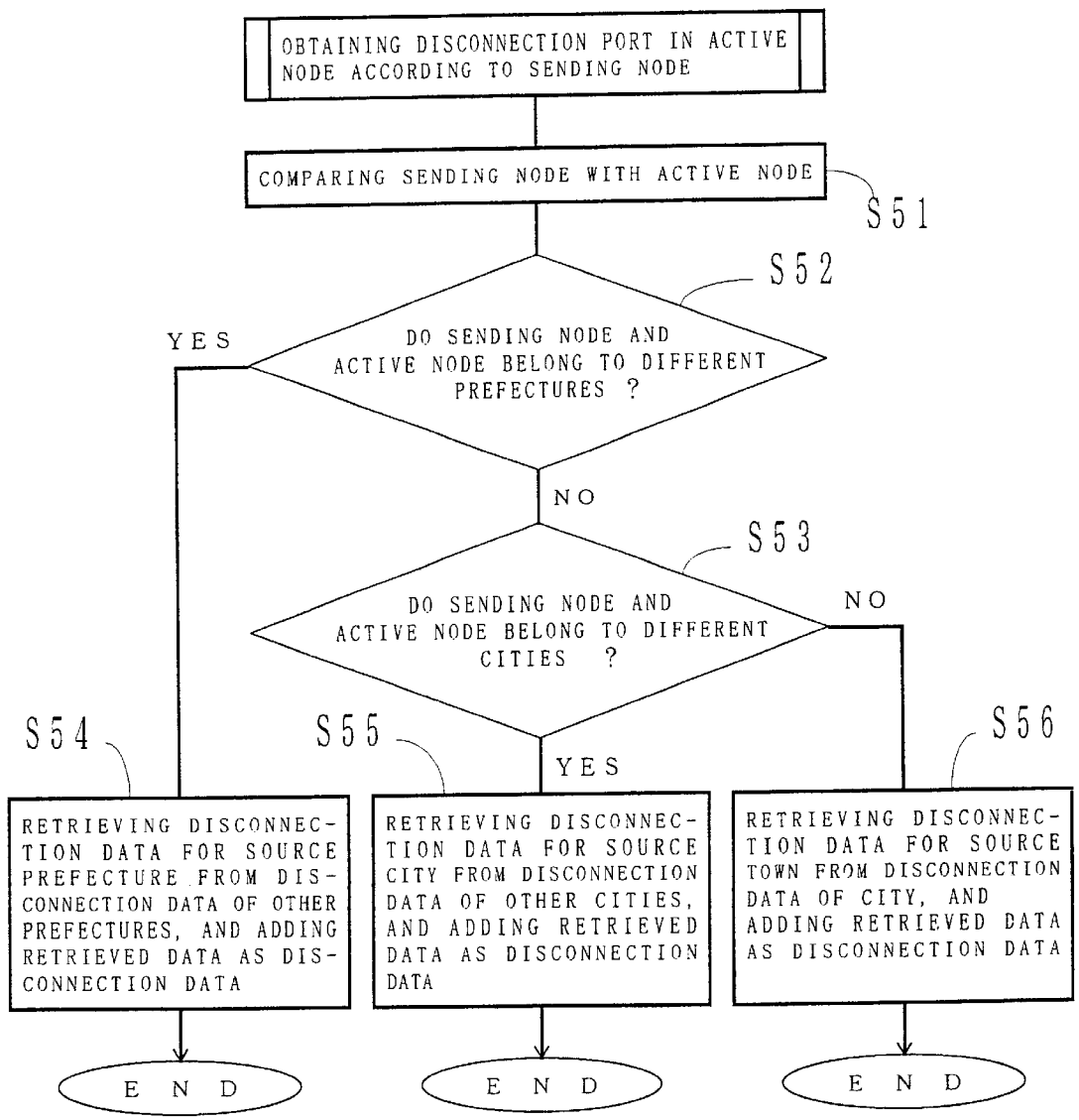
FIG. 14 is a flowchart showing the detailed operation in S2 shown in FIG. 10 when hierarchically stored disconnection data is used.

FIG. 14 is a flowchart showing the detailed operation in step S2 in FIG. 10 performed when hierarchically stored disconnection data is used. In FIG. 14, the hierarchical disconnection data is grouped into the prefecture data as the highest hierarchical order data; the city data as the second highest hierarchical order data; and the town data as the lowest hierarchical order data, that is, each node refers to a town. The grouped data is used when a disconnection port is obtained by the circuit described later and shown in FIG. 19.

In FIG. 14, the source node is compared with the active node (S51). Then, it is determined whether or not the prefecture of the source node is different from that of the active node (S52). If they are different ("yes" in S52), then the disconnection data for the source prefecture is retrieved from the disconnection data for other prefectures and defined as the disconnection port (S54).

If it is determined that they belong to the same prefecture ("no" in S52), it is, then, determined whether or not the city of the source node is different from that of the active node (S53). If they are different ("yes" in S53), then the disconnection data for the source city is retrieved from the disconnection data for other cities and defined as the disconnection port (S55). If they belong to the same city ("no" in S53), then the disconnection data for the source town is retrieved from the local disconnection data and defined as the disconnection port (S56).

Described below is a practical example of the network containing the nodes 11 provided with the addresses corresponding to the hierarchical groups as shown in FIG. 4. According to the first embodiment, the prefectures are in the highest hierarchical order, the cities are in the second highest hierarchical order, and the towns are in the lowest hierarchical order, that is, each node refers to a town.

FIGS. 15A, 15B, and 15C show the address of each node and the address of a packet destination node (there can be a plurality of packet destination nodes). FIG. 15A shows the address indicating the position of the source node or active node. The address can be specified in 3 bits for a prefecture in the highest order; a city in the second highest order; and a town in the lowest order. The position of each node can be specified by 9 bits. That is, there are 8 prefectures in the highest order, 8 cities in a prefecture, and 8 towns in a city. A total of 512 towns are entered.

When the data transfer route is set for each node, the addresses of all nodes excluding the active node, that is, 511 nodes, should normally be obtained. After the nodes are hierarchically grouped as shown in FIG. 4, data can be transmitted to a total of 511 destinations, that is, to the destinations in 7 prefectures other than the prefecture to which the active node belongs; to the destinations in 7 cities other than the city to which the active node belongs; and to the destinations in 7 towns other than the town to which the active node belongs. Thus, the amount of the routing data can be successfully reduced.

FIG. 15B shows the method of specifying the address of a destination node. According to the first embodiment, the destination node is represented by 18 bits to enable a plurality of destinations to be specified. That is, each bit of the 9-bit address shown in FIG. 15A is represented by 2 bits.

FIG. 15C shows the correspondence between the address indicating the position of the source node or active node shown in FIG. 15A and the address indicating the position of the destination node. For example, the lowest order bit 0 of the address indicating the town corresponds to the two bits (bits 0 and 0X) of the destination node. "00" of the two bits corresponds to 0 of the node position, "01" correspond to 1, and "10" and "11" correspond to X which indicates either 1 or 0 and represents a plurality of destinations.

If 6-bit 001001 is specified as an address of the destination prefecture, it refers to 0X1 in the ternary using 0, 1, and X. Since X can be either 0 or 1, the destination prefectures 001 and 011 are designated. Likewise, when a destination city is specified by 6 bits 101100, it refers to XX0 in ternary. Since X can be either 0 or 1, four cities 000, 010, 100, and 110 are specified. A plurality of destinations can be specified by listing a plurality of destinations represented in ternary and in the conventional binary.

Figure 16:
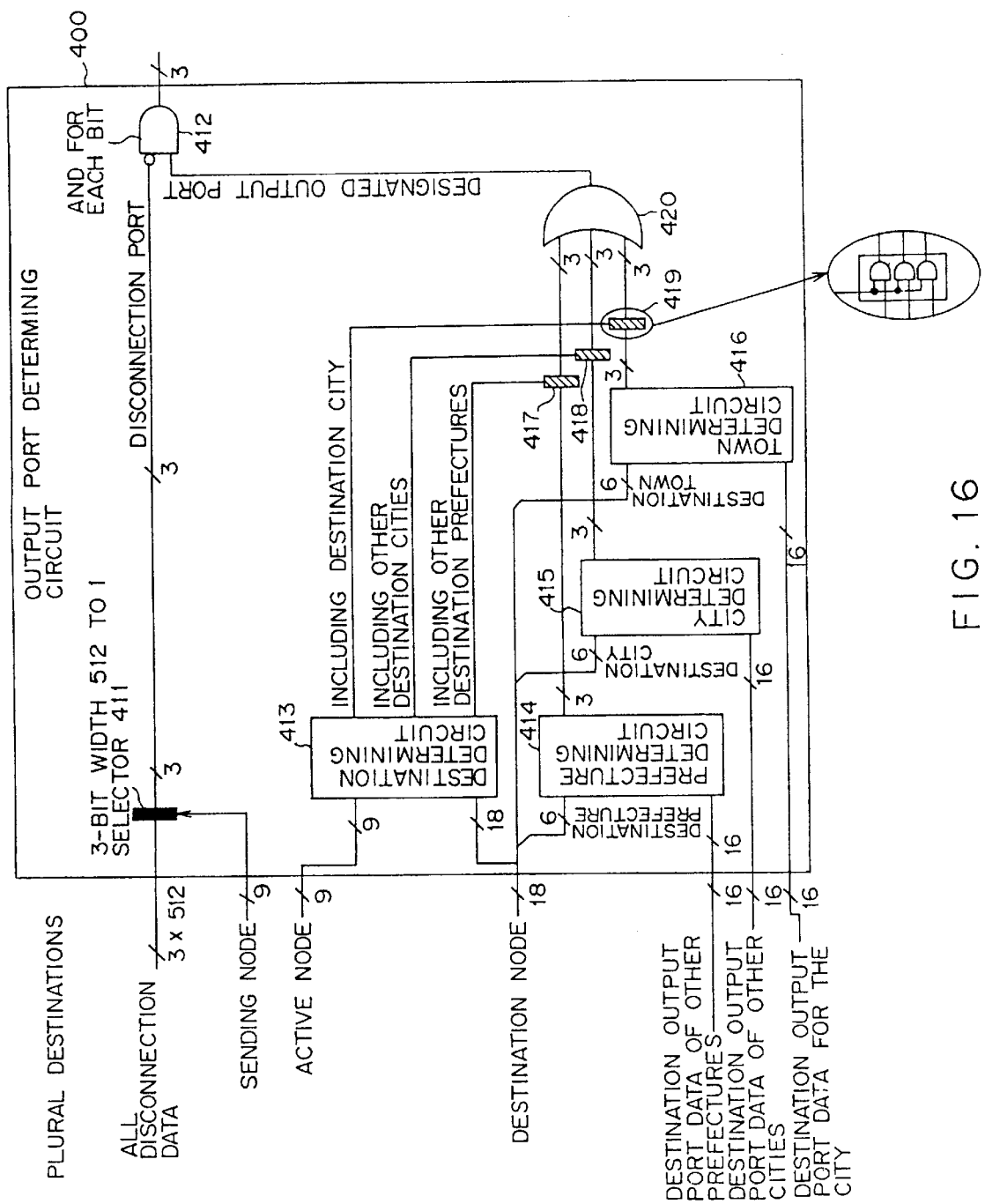
FIG. 16 is a block diagram showing the configuration of the output port determining circuit, provided for each node in a network, for determining the output port of the packet from the active node.

FIG. 16 is a block diagram showing the configuration of the output port determining circuit, provided in each node of the network, for determining the output port of the packet from the active node. In FIG. 16, a port disconnection data is selected and used in each case in which all nodes except the active node, that is, 511 nodes, are source nodes for simplicity. The port disconnection data is generated as described later.

In FIG. 16, an output port determining circuit 500 comprises a selector 411; AND gate 412; destination determining circuit 413; prefecture determining circuit 414; city determining circuit 415; town determining circuit 416; AND gates 417, 418, and 419; and OR gate 420. The selector 411 selects, for simplicity of the circuit, 3-bit port disconnection data corresponding to the address of the source node when each of the 412 nodes is a packet source node. The AND gate 412 obtains a bit-by-bit logical product between the 3-bit port disconnection data as an output of the selector 411 and the 3-bit output port data described later. The destination determining circuit 413 receives 9 bits indicating the position of the active node and 18-bit packet destination data, and determines whether a plurality of destinations include the nodes in other than the prefecture to which the active node belongs, include the nodes in other than the city to which the active node belongs, or include the nodes in the city to which the active node belongs. The prefecture determining circuit 414 receives 6-bit destination prefecture data and 16-bit output port data for the destinations in other than the prefecture to which the active node belongs, and outputs 3-bit output port data for the destination prefectures. The city determining circuit 415 outputs 3-bit output port data to the destination cities. The town determining circuit 416 outputs output port data to the destination towns. The AND gates 417, 418, and 419 transmit the outputs from the three determining circuits 414, 415, and 416 to the OR gate 420 in response to the output of the destination determining circuit 413. The OR gate 420 outputs any of the 3-bit data received from these three AND gates 417, 418, and 419 to the AND gate 412. The port disconnection data from the selector 411 is input to the AND gate 412 as a negative logic.

The destination output port data for other prefectures, cities, or local destination output port data are set corresponding to the routing data stored in each node. Since each node is hierarchically grouped, the routing data is sufficient if it is prepared for the prefectures, cities in one prefecture, and towns in one city. When data is transmitted to other prefectures based on the destination data, the output port signal of the corresponding node is output from the prefecture determining circuit 414 according to the destination output port for other prefectures initially set based on the routing data. For the 512 nodes, the conventional destination output port data is 1024 bits (=512×2). However, according to the present embodiment, each node is hierarchically grouped and the destination output port data is represented by 48 bits (=3×8×2), thereby considerably reducing the amount of data.

The operation of the output port determining circuit 400 shown in FIG. 16 is summarized as follows. The destination determining circuit 413 compares the active node with the destination node. When the destination nodes belong to prefectures other than the prefecture to which the active node belongs, the gate of the AND gate 417 is opened. The destination prefecture data in the destination nodes is received by the prefecture determining circuit 414 together with the destination output port data for other prefectures set corresponding to the prefecture routing data. The 3-bit signal indicating the designated output port corresponding to the destination prefecture is transmitted to the AND gate 412 through the AND gate 417 and OR gate 420. The AND gate 412 outputs a designated output port signal when the designated output port is not a disconnection port. Similarly, the designated output port signal is output by the city determining circuit 415 or town determining circuit 416 depending on whether the destination node belongs to the city to which the active node belongs. The output port of each node can be designated by providing the output port determining circuit 400 shown in FIG. 16 in each of the hierarchically grouped node as shown in FIG. 4.

Figures 17A, 17B:
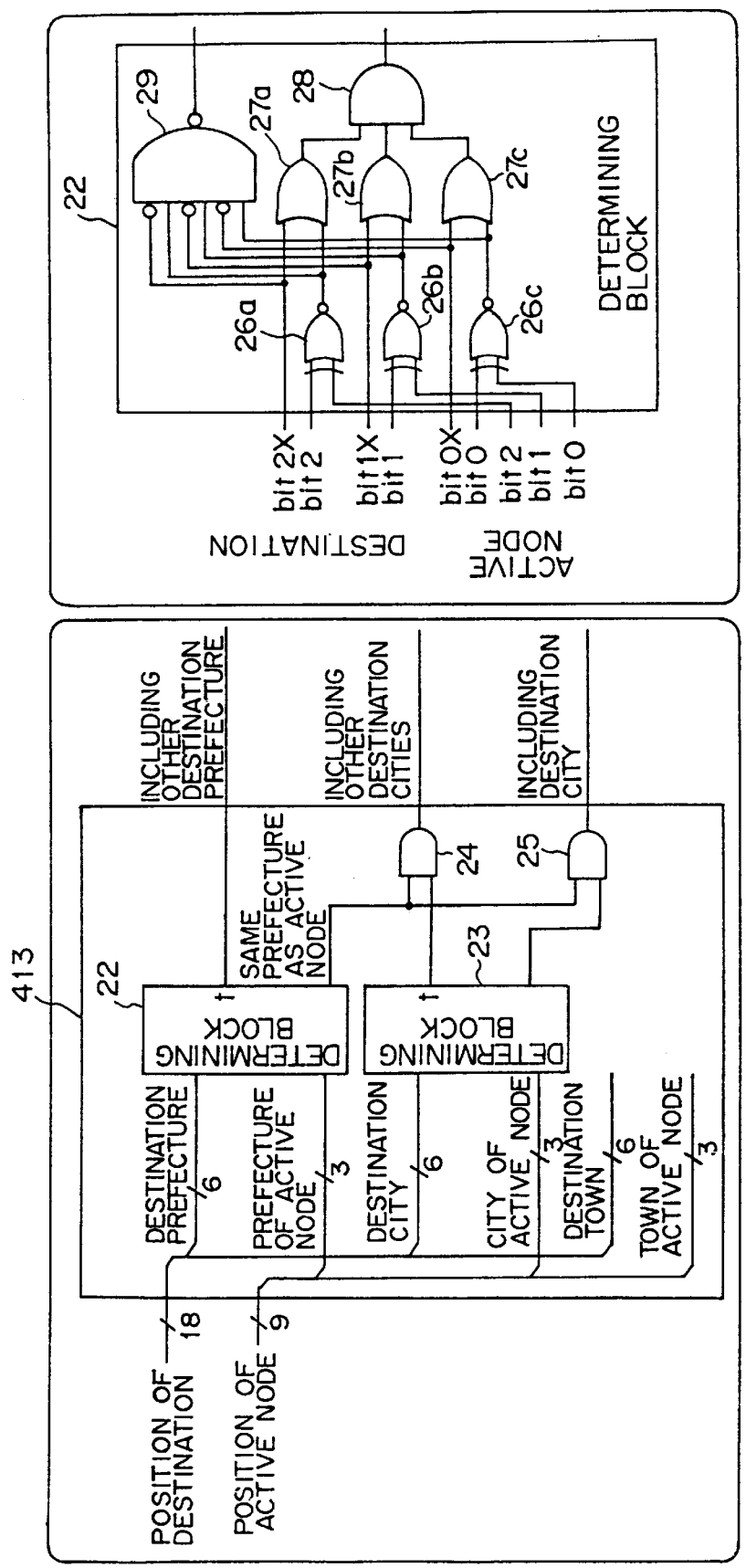
FIGS. 17A and 17B show the detailed configuration of the destination determining circuit 413 of the output port determining circuit 400 shown in FIG. 16.

FIGS. 17A and 18B show detailed configurations of the destination determining circuit 413 in the output port determining circuit 400 shown in FIG. 16. FIG. 17A shows the general configuration of the destination determining circuit which comprises two determining blocks 22 and 23, and two AND gates 24 and 25. The determining block 22 determines whether the destination contains the data of the prefecture other than that of the active node or the prefecture of the active node. Similarly, the determining block 23 determines whether the destination contains the data of the city other than that of the active node or the city of the active node. If the determining block 22 determines that the destination refers to other prefectures, then the output is provided for the AND gate 417 shown in FIG. 16. If it determines that the destination refers to other prefectures, the output is provided for the AND gate 417 in FIG. 16. If it determines that the destination is limited to the prefecture of the active node, the output is provided for the AND gate 418 after calculating the logical product using the AND gate 24 and the output obtained when the determining block 23 determines that the destination refers to other cities than the city to which the active node belongs. Similarly, the AND gate 25 obtains a logical product between the output obtained when the determining block 22 determines that the destination is limited to the specified prefecture and the output obtained when the determining block 23 determines that the destination is limited to the city of the active node. The output is provided for the AND gate 419.

FIG. 17B shows the detailed configuration of the determining blocks 22 and 23. Since the configuration of the determining block 22 is the same as that of the determining block 23, only the operation of the determining block 22 is described below.

The determining block 22 is assigned bits 0, 1, and 2 of the address of the prefecture indicating the position of the active node; and six bits for destination data, that is, bit 0, 0X, 1, 1X, 2, and 2X. First, three EX NOR gates 26a through 26c respectively compare bit 0, 1, and 2 of the position of the active node with those of the destination node. When the comparison outputs a coincident result, the output is 1, and the output of an AND gate 28 is 1 through three OR gates 27a through 27c. The output of the AND gate 28 shows that the prefecture to which the active node belongs is normally one of a plurality of destination prefectures.

On the other hand, the output of a NAND gate 29 is 1 when the destination prefectures refer to those other than the one to which the active node belongs. The output of the NAND gate 29 is 0 when the outputs of the three EX NOR gates 26a through 26c equal 1 and bits 0X, 1X, and 2X equal 0. It is 1 for all other input combinations.

If the address of the destination prefecture is 0XX (four prefectures 000, 001, 010, and 011) and the address of the prefecture of the active node is 100, then the destination prefecture does not refer to the prefecture of the active node. In this case, the output of the AND gate 28 is 0 and the output of the NAND gate 29 is 1. If the destination is 101 and the prefecture of the active node is 101, then the output of the AND gate 28 is 1 and the output of the NAND gate 29 is 0. That is, the output of the NAND gate 29 is 0 only when the addresses of the destination and active node match each other, the destination does not refer to X, and all bits 0X, 1X, and 2X are 0. If the destination is X01 (two prefectures 001 and 101) and the address of the active node is 101, then the outputs of the AND gate 28 and NAND gate 29 are 1 and the destination refers to the prefecture of the active node and also to another prefecture.

Figure 18:
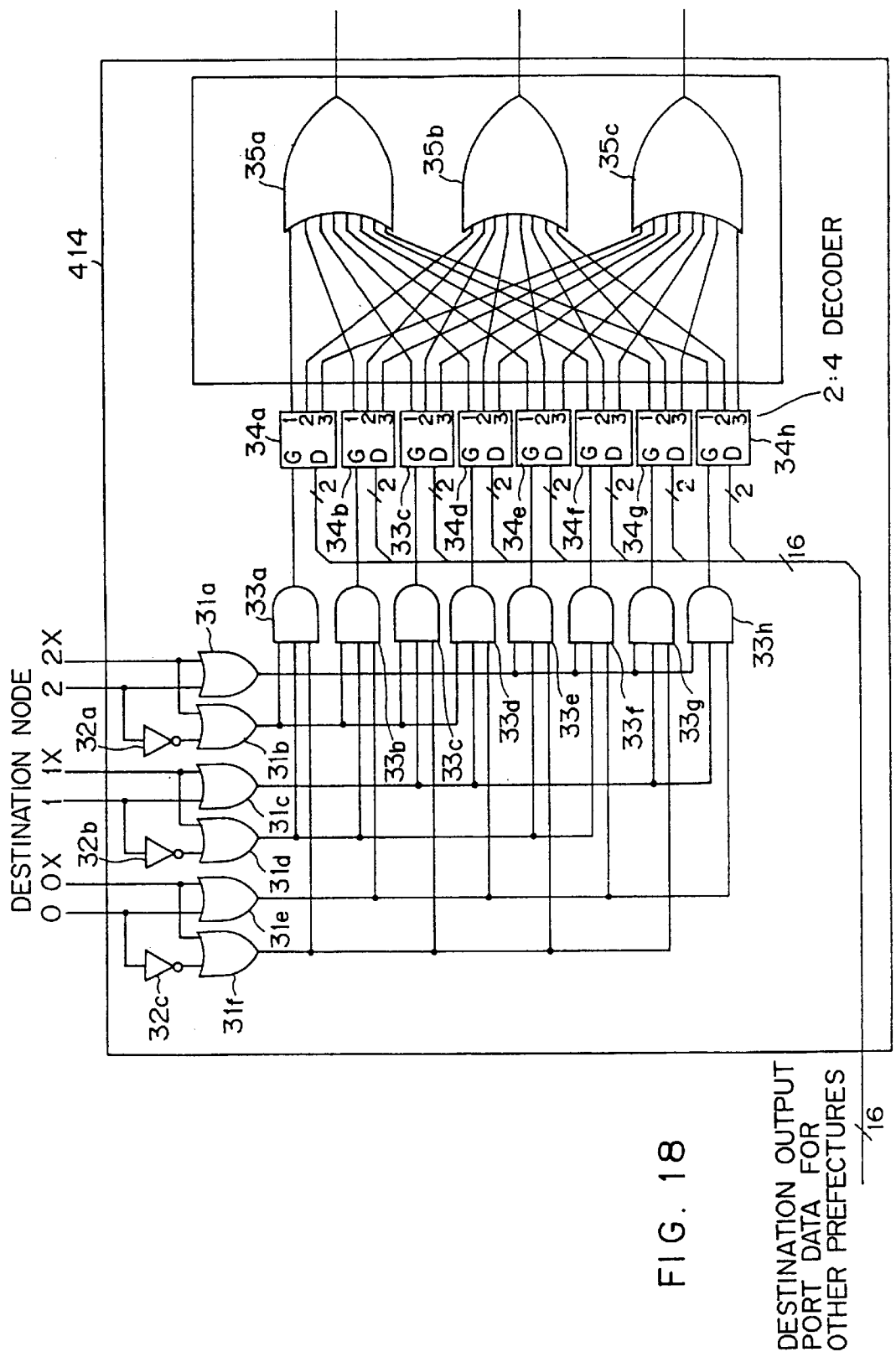
FIG. 18 shows the detailed circuit of the three determining circuits 414, 415, and 416 shown in FIG. 16.

FIG. 18 shows the detailed configuration of the three determining circuits 414, 415, and 416 shown in FIG. 16. These three determining circuits 414 through 416 are the same in configuration and only the operation of the prefecture determining circuit 414 is explained below as an example.

In FIG. 18, the prefecture determining circuit 414 comprises six OR gates 31a through 31f; eight AND gates 33a through 33h; eight 2-to-4 decoders 34a through 34h; and three OR gates 35a through 35c. The OR gates 31a through 31f receive two bits of the six address bits of the input destination prefecture, or receive one of the two bits after inverters 32a through 32c invert the bit. The AND gates 33a through 33h receive the output of the six OR gates. The 2-to-4 decoders 34a through 34h receive at the enable terminals the outputs of these eight AND gates and also receive, in 2-bit units, the 16-bit destination output port data for other prefectures for use in determining the output port when a packet is transmitted to other prefectures. The three OR gates 35a through 35c receive the outputs of the eight decoders.

Thus, the prefecture determining circuit 414 outputs 3-bit data indicating the output port through which the packet is to be output in response to the 6-bit address of the destination prefecture and 16-bit destination output port data for other prefectures. The operation of the circuit is explained by assuming that the OR gate 35a specifies the output of packets to the output port 1, that the OR gate 35b specifies the output of packets to the output port 2, and that the OR gate 35c specifies the output of packets to the output port 3.

Assuming that the address of the destination prefecture is 011010 in binary from bit 2X in FIG. 15B, 1XX (100, 101, 110, and 111) in ternary, and 4, 5, 6, and 7 in decimal, the outputs of the four lower order AND gates, that is, the AND gates 33e through 33h, from in a total of eight AND gates are 1. The lower order decoders, that is, the 2-to-4 decoders 34e through 34h, from a total of 8 decoders are provided with enable signals.

All of the eight decoders 34a through 34h are typical 2-to-4 decoders, and all their outputs are 0 if the enable signals are 0. If the enable signals of 1 are provided, they output 0001 in response to an input of 00; 0010 in response to an input of 01; 0100 in response to an input of 10; and 1000 in response to an input of 11. According to the first embodiment, the last 1 bit of the 4-bit output is not used. The outputs 3, 2, and 1 shown in FIG. 18 represent the highest order bit, second bit, and third bit respectively in the 4-bit output.

The data input to the eight 2-to-4 decoders 34a through 34h in 2-bit units is 16-bit destination output port data for other prefectures. The data is used in determining an output port of the packet from the active node to the destination prefecture. Assuming that the output ports for prefectures 7, 6, 5, 4, 3, 2, 1, and 0 are defined as no output, through ports 3, 2, 1, 3, 2, 1, and 0 respectively, the 16-bit destination output port data for other prefectures is provided as 00, 11, 10, 01, 11, 10, 01, 00 in 2-bit units for the eight decoders 34a through 34h.

When the address 10X of the destination prefecture is input, the destinations are prefectures 100 and 101, that is, prefectures 4 and 5 in decimal. The outputs of the AND gates 33e and 33f of the eight AND gates are 1. The output of 1 of the AND gate 33e sets the decoder 34e in the enabled state. The decoder 34e receives 01 indicating the output port 1 as the destination output port data for other prefectures. The resultant output of the decoder is 001, and the output of the OR gate 35a is 1. Although the decoder 34f is set in the enabled state by the output of 1 from the AND gate 33f, the decoder receives 10 indicating the output port 2 as output port data. As a result, the output is 010 and the output of the OR gate 35b is 1. Therefore, the outputs of the OR gates 35a and 35b indicating the outputs of the packets to ports 1 and 2 are 1.

In this case, a total of 16 bits are required to specify output ports in 2 bits, with the destination output ports for other prefectures corresponding to 8 prefectures.

Figure 19:
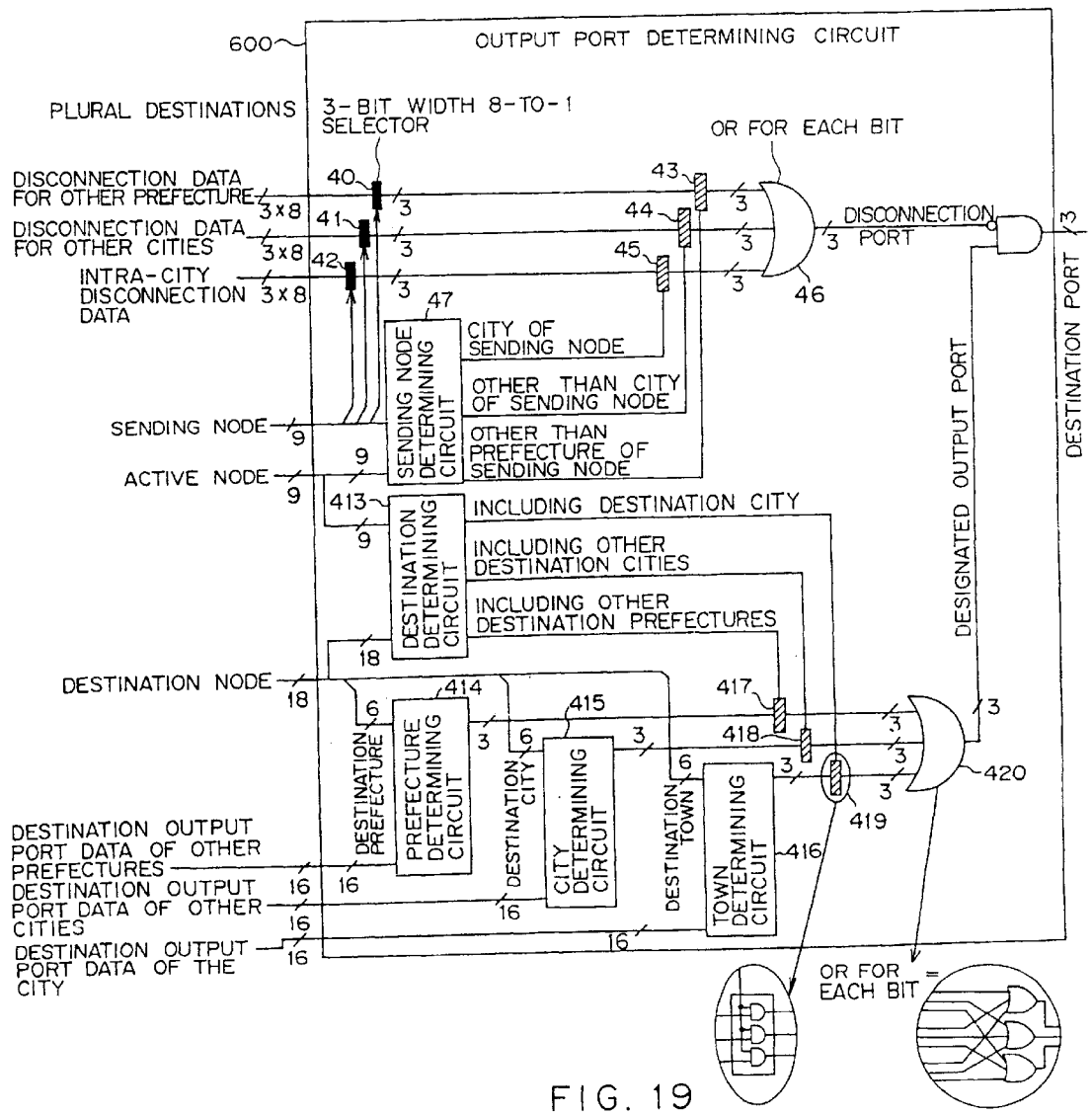
FIG. 19 is a block diagram showing the configuration of the output port determining circuit when port disconnection data is saved.

FIG. 19 is a block diagram showing the configuration of the output port determining circuit using the method of saving and storing port disconnection data of the active node for the packet source node, that is, the port disconnection data is stored corresponding to seven prefectures other than the one to which the active node belongs, seven cities other than the one to which the active node belongs, and seven towns other than the one to which the active node belongs. When an output port determining circuit 600 shown in FIG. 19 is compared with the output port determining circuit 400 shown in FIG. 16, a 3-bit width 512-to-1 selector 411 shown in FIG. 16 corresponds to three 3-bit width 8-to-1 selectors 40 through 42, AND gates 43 through 45 (same in configuration with the AND gates 417 through 419), OR gate 46, and a source node determining circuit 47 in FIG. 19. The units commonly shown in FIGS. 16 and 19 are assigned the same unit numbers, and the explanation is omitted.

The three selectors 40 through 42 are provided with the port disconnection data for each case where the source node is in other prefectures, in other cities, or in the city to which the active node belongs. It can be obtained by multiplying the number 3 of the output port by the number 8 of the prefecture. The port disconnection data for other prefectures is not required for the prefecture to which the active node belongs. The disconnection data for other prefectures can be 3×7, but the port disconnection data for the eight prefectures is provided for all nodes for simplicity of the circuit. One piece of the port disconnection data is selected in 3-bit units from a total of 9 bits of the address of the source node. The selected data is provided for the AND gates 43 through 45.

A source node determining circuit 47 compares the address of the source node with that of the active node, and determines whether the source node is external to the prefecture of the active node, external to the city of the active node, or in the city of the active node. In response to the determination result, one of AND gates 43 through 45 outputs 3-bit port disconnection data to an OR gate 46. The OR gate 46 outputs the port disconnection data to the AND gate 412 as shown in FIG. 16.

Figure 20:
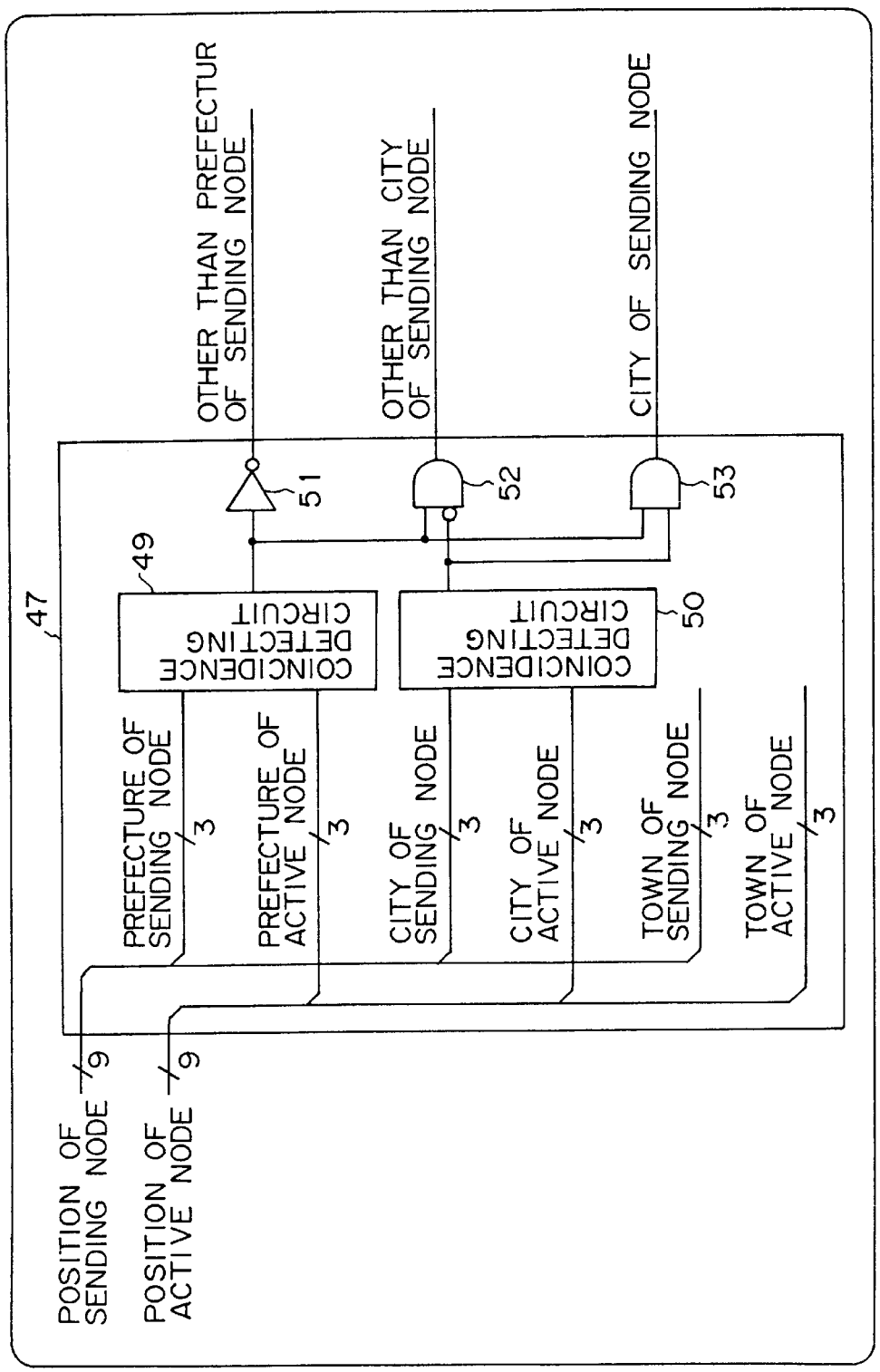
FIG. 20 is a block diagram showing the configuration of the sending node determining circuit 47 shown in FIG. 19.

FIG. 21 is a block diagram showing the configuration of the source node determining circuit 47. In FIG. 20, coincidence detecting circuits 49 and 50 compare the prefecture and city addresses of the source node with those of the active node, and output 1 when the comparison outputs a coincident result. When the coincidence detecting circuit 49 determines that the prefecture addresses match each other, the output is inverted by an inverter 51 into 0. Therefore, if the coincidence detecting circuit 49 determines that the addresses do not match each other, a signal indicating that the source node is external to the prefecture to which the active node belongs is provided for the AND gate 43. The output of a coincident detecting circuit 50 is provided as a negative logic for an AND gate 52. When the output of the coincidence detecting circuit 49 is 1 and the output of the coincidence detecting circuit 50 is 0, a signal indicating that the source node is external to the city to which the active node belongs is provided for an AND gate 44. When the outputs of the coincidence detecting circuits 49 and 50 are 1, the output of the AND gate 53 is 1, and a signal indicating that the source node is in the city to which the active node belongs is provided for an AND gate 45.

As described above, one of the 3-bit outputs of the AND gates 43 through 45, is provided for the AND gate 412 through the OR gate 46 and compared with the output port output by the OR gate 420. That is, when the bit value indicating an output port is 1 and the bit value indicating a disconnection port is 0 (no disconnection), the output port corresponding to the bit is determined as an output port to the destination by the AND gate 412.

Described below is the process of generating the disconnection information of a port according to the first embodiment of the present invention. FIG. 21 shows the procedure of generating the disconnection information for the port of each node without reducing the amount of the port disconnection information to be stored in each node when all nodes in the network are the source of the packet. In FIG. 21, for each variable (set) {executable statement} indicates that the variable is assigned the elements of the set sequentially one by one to execute the executable statement. /*comment statement*/ indicates that the contents between * and * are defined as a comment statement.

In FIG. 21, all nodes in the network are defined as the source nodes of the packet. First, assuming that one node is a source node, all ports of all nodes in the network are assigned disconnection marks. Then, the disconnection marks are removed on the route from the source node to the destination node.

When all nodes except the source node are destination nodes and a packet is transmitted through the route determined according to the distribution information in this process, all disconnection marks are removed on the route.

As a result of the above described process, the the remaining disconnection marks refer to the disconnection information of each node corresponding to the source node. In this process, the port disconnection information is 1 when the disconnection marks remain in the ports of the node. The disconnection information is 0 when no disconnection marks remain.

The above described processes are performed when all nodes forming the network are selected as source node, and the port disconnection information in all nodes in the network is generated.

FIGS. 22 through 25 show the procedure of generating the port disconnection information in the reduced amount depending on the case where the packet sending node is in the prefecture other than that to which the active node belongs, in the same prefecture but in the city other than that to which the active node belongs, and in the same city but in the town other than that to which the active node belongs when, as shown in FIG. 15, the highest order of the hierarchical address indicates a prefecture, the second highest order indicates a city, and the lowest order indicates a town, and when the hierarchical address is added to each node in the network.

FIG. 22 shows the procedure of generating the port disconnection information to be held in all nodes in all prefectures other than the prefecture to which the packet sending node belongs.

In FIG. 22, the prefecture to which the packet sending node belongs is an object prefecture and is first marked for disconnection. In this process, the disconnection mark is added to all ports of all nodes in the network.

Then, all disconnection marks on the route are removed when a packet is transmitted from the sending node to the destination node, in each case where all nodes in other than the prefecture to which the sending node belongs are destination nodes.

The disconnection information is generated by the last remaining disconnection mark. In this process, the disconnection information of the port with the disconnection mark is 1 while the disconnection information of the port without the disconnection mark is 0 for all nodes in other than the prefecture to which the sending node belongs. The process is performed on each case where the packet sending node is in each of all the prefectures. The process of generating the port disconnection information for all nodes when the packet sending node is in other prefectures then terminates.

FIG. 23 shows the process of generating the port disconnection information for each node when the packet sending node is in the same prefecture but in the city other than that to which the active node belongs. In FIG. 23, all processes are performed on all prefectures. First, the process is performed in each case where each city in a prefecture is a packet sending node. Assuming that a city in the prefecture is a packet sending node, all ports of all nodes in the prefecture are marked for disconnection.

Then, the process of removing the disconnection mark from all nodes in the prefecture but in the city other than that the city to which the packet sending node belongs. The remaining disconnection mark refers to the disconnection information. At this time, a disconnection information value indicating the existence or non-existence of a disconnection mark is set for all ports of all nodes in the prefecture, but in the city other than that to which the packet sending node belongs. This process is performed in each case where all cities in a prefecture are the packet sending nodes, and then on each case where all cities in all prefectures are the packet sending nodes. Then, the process terminates.

FIG. 24 shows the process of generating the port disconnection information performed on the town other than that to which the packet sending node belongs in the same city and prefecture. This process is performed in each case where the packet sending node belongs to all towns in all cities in all prefectures as shown in FIGS. 22 and 23.

Assuming that the packet sending node belongs to a city, the disconnection mark is added to all ports of all nodes in the town. The disconnection mark is removed if all nodes in the town other than that to which the packet sending node belongs are destination nodes. According to the remaining disconnection mark, the port disconnection information is generated as shown in FIGS. 22 and 23.

FIG. 25 shows the process of generating the port disconnection information with the object hierarchical level varied.

In the process shown in FIG. 25, the hierarchical level in which the entire network is one block is defined as the highest order hierarchical level. The hierarchical level in which one node refers to one block is defined as the lowest order hierarchical level. Each node has the port disconnection information (1 bit) with each block simultaneously satisfying the following conditions (1) and (2) regarded as a sending position for each output port.

(1) The block does not include the node.
(2) The block one level higher than the above described block includes this node.

The block satisfying these conditions can exist in all hierarchical levels lower than the highest order hierarchical level.

In FIG. 25, all processes are performed on all blocks belonging to each of all hierarchical levels starting with the highest order level.

First, assuming that the block of one level higher than the object block is referred to as a "higher order block", and a node in the object block is referred to as a sending node, a disconnection mark is provided for all ports in all nodes in a higher order block.

Then, the disconnection mark is removed from all nodes in the higher order block, not in the object block.

Next, remaining disconnection marks are used as disconnection information. That is, a disconnection information value is set for all ports of the object node depending on the existence or non-existence of the disconnection mark.

Figure 26:
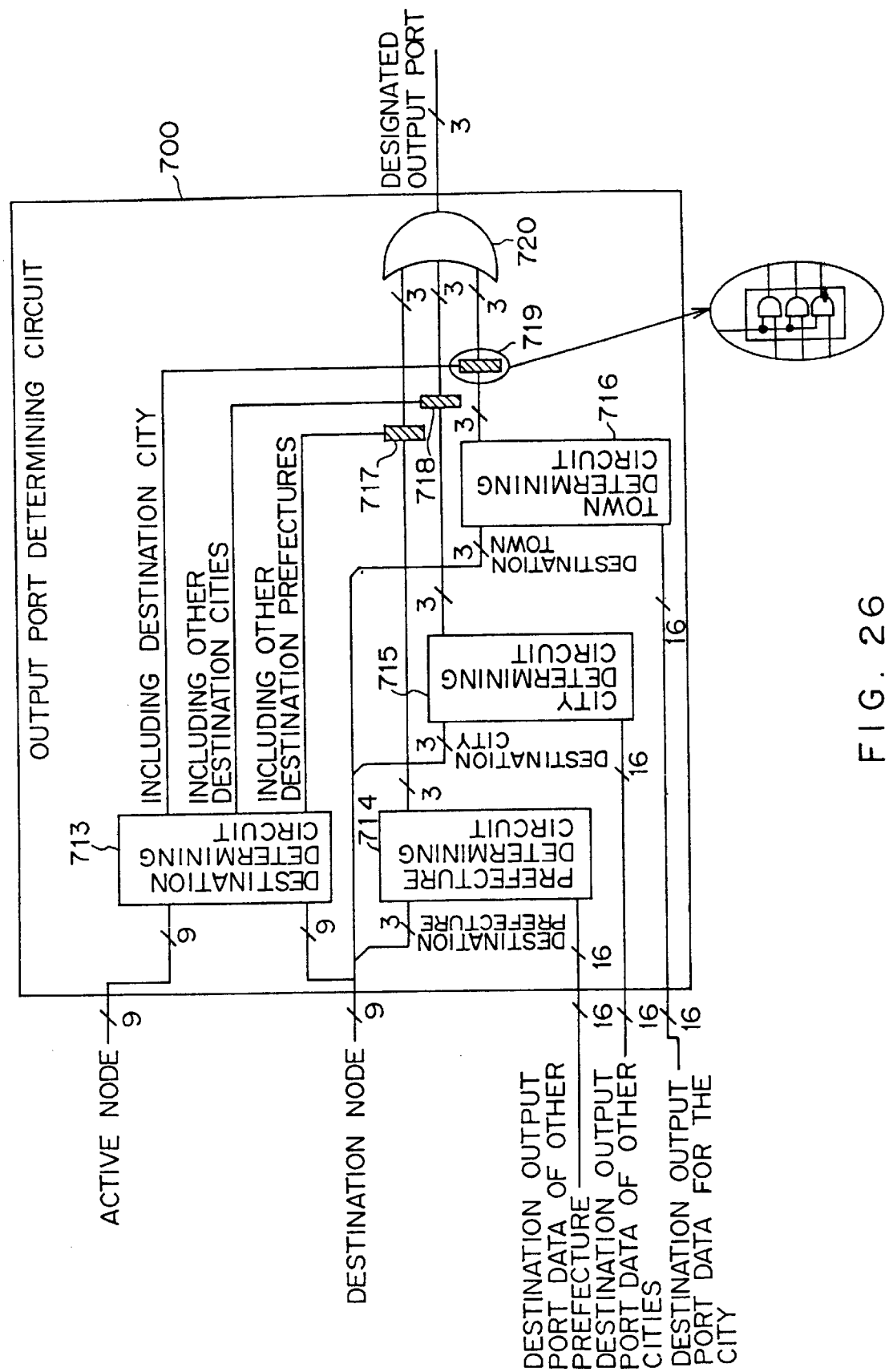
FIG. 26 is a block diagram showing the output port determining circuit when a packet is transmitted to one destination.
Figure 27:
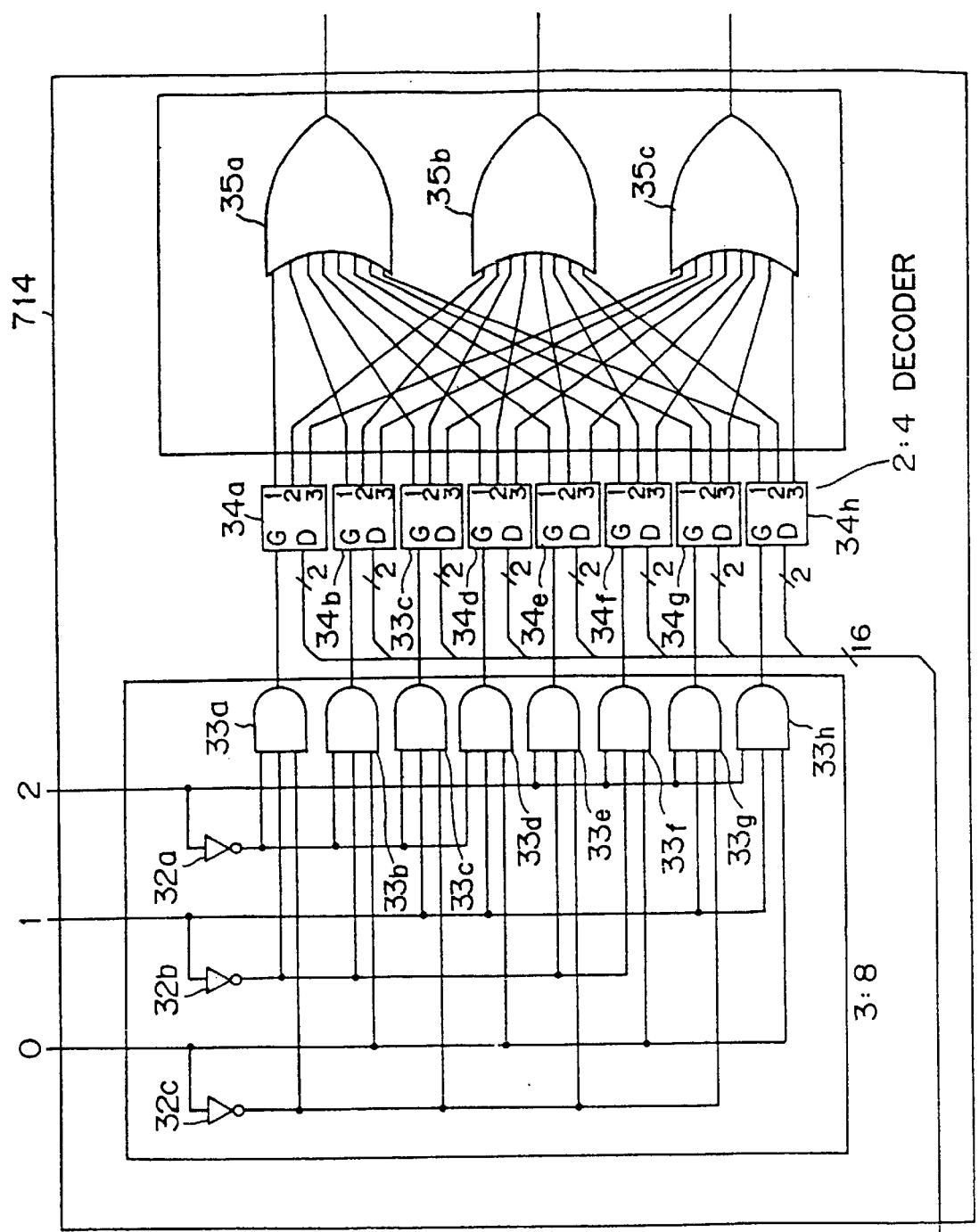
FIG. 27 shows the detailed configuration of one of the prefecture determining circuit, city determining circuit, and town determining circuit.

FIGS. 26 and 27 show an output port determining circuit 700 and a prefecture determining circuit 714 provided for the circuit used when there is a single destination in FIGS. 16 and 18 and, therefore, the destination address is not represented by an X and no disconnection is made.

The circuits shown in FIGS. 26 and 27 are formed by grouping the nodes and assigning the hierarchical levels to the nodes according to the present invention. In FIGS. 26 and 27, detailed explanation is omitted by assigning the identification numbers corresponding to the units also shown in FIGS. 16 and 18. The operation of obtaining the designated output port when a packet is input to each input port of each node in the circuit shown in FIG. 26 is explained by referring to FIG. 28.

Figure 28:
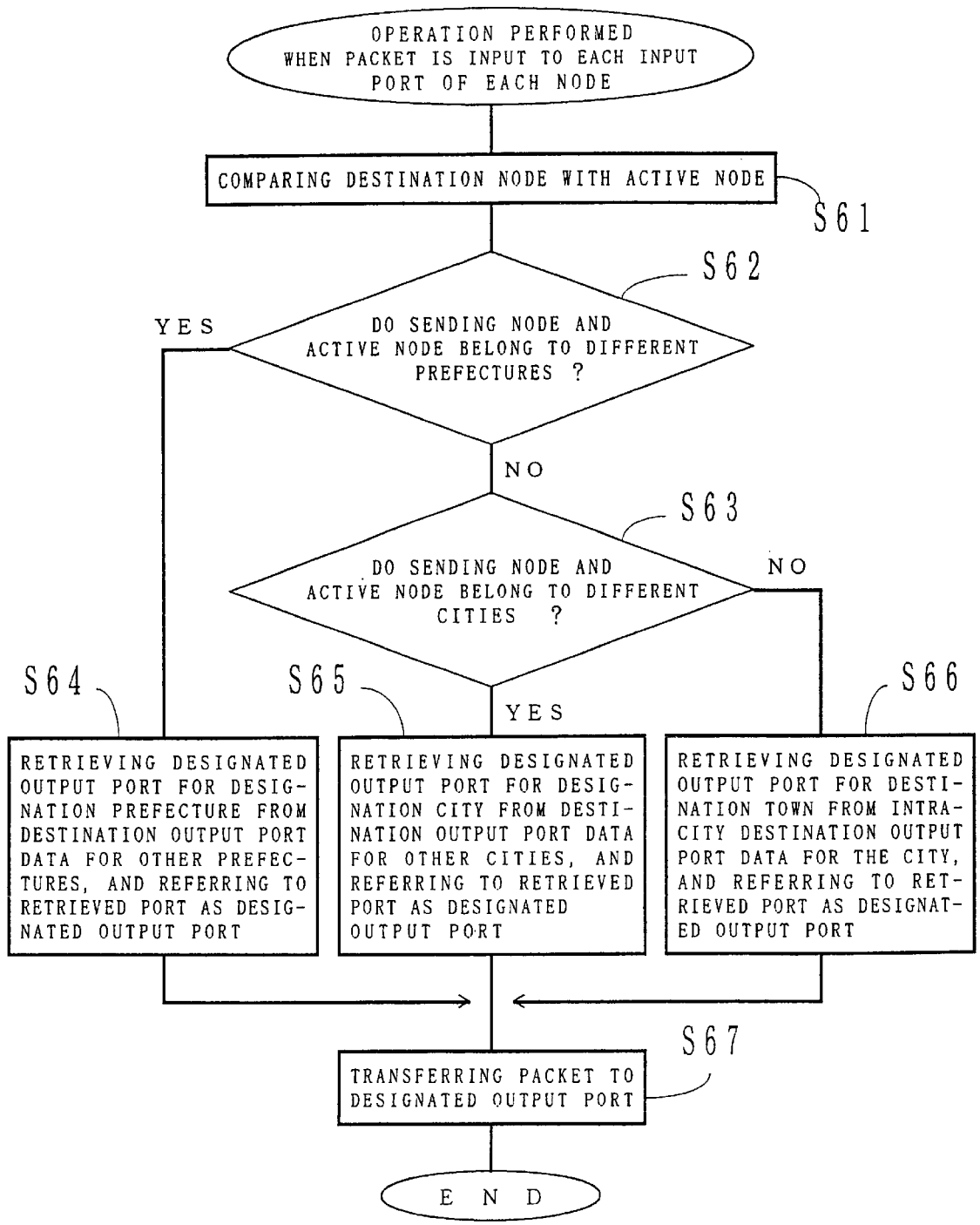
FIG. 28 is a flowchart of the process of obtaining the output port when there is a single destination and a packet is input to each input port of each node.

FIG. 28 is a flowchart of the process of obtaining the output port when a packet is input to each input port of each node when there is a single destination.

In FIG. 28, the destination node is compared with the active node (S61). Then, it is determined whether or not the destination node belongs to a different prefecture from that of the active node (S62). If they belong to different prefectures ("yes" in S62), a designated output port corresponding to the destination prefecture is retrieved from the destination output port data for other prefectures, and is defined as a designated output port (S64). If they belong to the same prefecture ("no" in S62), it is determined whether or not the city of the destination node is different from that of the active node (S63). If they are different ("yes" in S63), the designated output port corresponding to the destination city is retrieved from the destination output port data for other cities and is defined as the designated output port (S65). If they belong to the same prefecture ("no" in S63), then the designated output port corresponding to the destination town is retrieved from the destination output port data for the city and is defined as the designated output port (S66).

Finally, a packet is transferred to the designated output port determined as described above (S67).

Described below is the second embodiment according to the present invention. According to the second embodiment, a packet is transferred through a communications route in any node without storing destination information in each node forming part of a network having an irregular topology. Therefore, a packet is transferred with only a small amount of routing information stored in the packet. The configuration corresponding to the second embodiment comprises a packet analyzing unit 111 shown in FIG. 29 and a network node unit 110 comprising the packet analyzing unit 111 and shown in FIG. 7.

Figure 29:
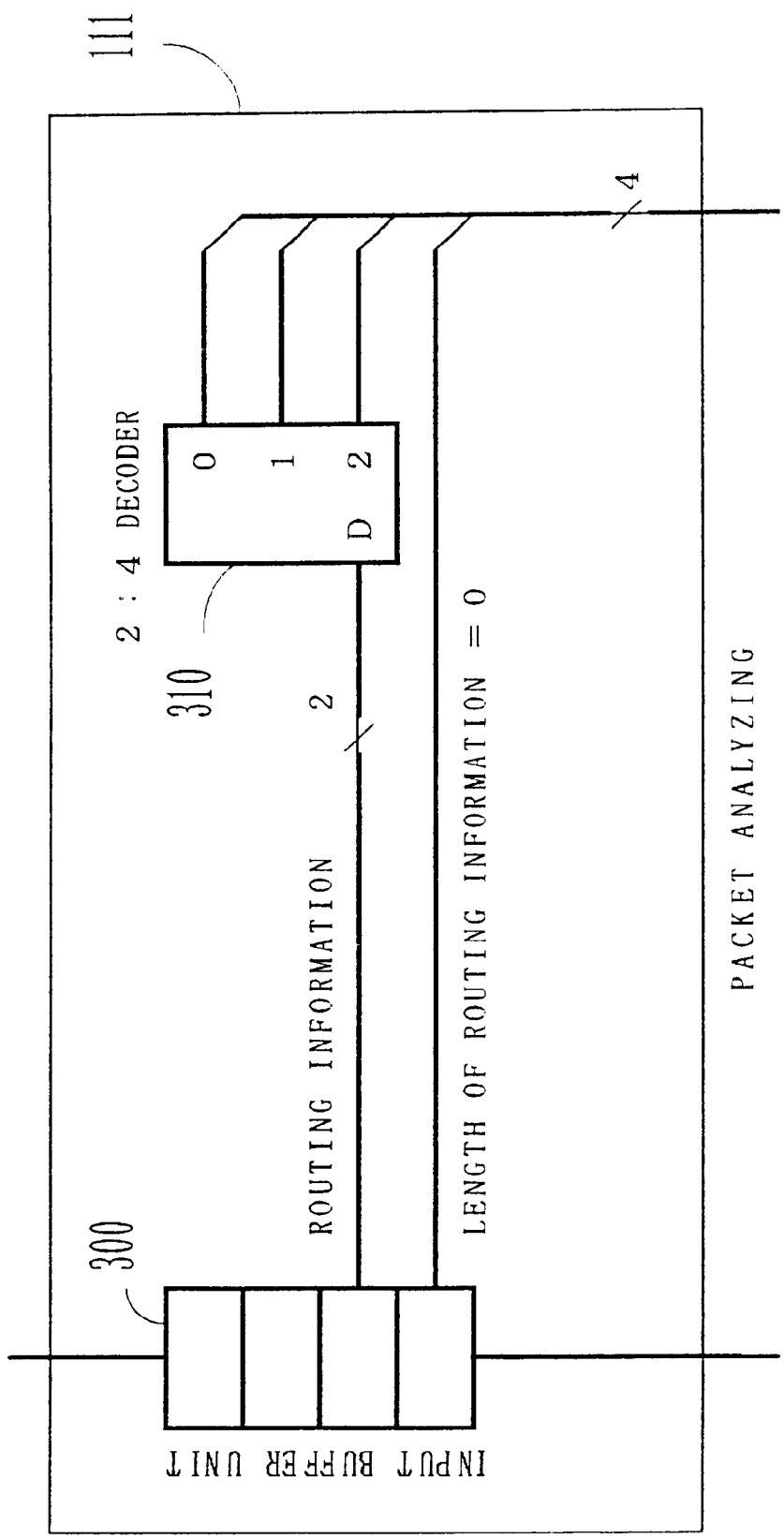
FIG. 29 shows an example of the configuration corresponding to the embodiment 2 of the packet control unit shown in FIG. 7.

FIG. 29 shows an example of the configuration according to the second embodiment of the packet analyzing unit shown in FIG. 7. In FIG. 29, the packet analyzing unit 111 comprises an input buffer unit 300 and 2-to-4 decoder 310.

The input buffer unit 300 temporarily stores the data in the input packet, detects a portion indicating the number of the leading bits (2 bits in this case) in the routing information in the data. Then, it outputs the portion to the 2-to-4 decoder 310. It also detects a portion indicating the length of the routing information, and writes it back to the packet with the read length data removed. The 2-to-4 decoder 310 decodes and outputs the input 2-bit routing information.

In the network shown in FIG. 4, for example, if a packet is transmitted by the nodes having the three input/output ports (bi-directional communications routes) through the left, center and right transmission lines in the network shown in FIG. 4, and if two bits 10, 11, and 01 are used for representing the nodes, then the communications route from the node P-c-1 to the node Q-c-0 can be represented by the 10 bits 010101011.

If a packet provided with the routing information is transmitted from the node P-c-1, the direction of the packet is determined according to the routing information in 2-bit units in each relay node, and the routing information is discarded in the relay node, then it is determined that a node is a destination node of a packet when the packet arrives with all routing information removed, and the packet data is received. If the number of relay nodes to the destination node is small, that is, if a packet is transmitted to a node near by, then the amount of the routing information is reduced, thereby improving the efficiency of the data transfer. Assuming that the number of the output ports of each relay node is N (normally depending on the node), the number of bits of the routing information required to determine the output port of the node is calculated by the following equation (1).

$$\text{Number of Bits in Routing Information} = \log_2 N \text{ (decimal places are carried)} \quad (1)$$

FIG. 30 shows the process of determining the output port through which a packet is output from the active node according to the second embodiment. In FIG. 30, if the length of the routing information is larger than 0, the leading 2 bits are retrieved (the leading 2 bits in the routing information in a packet is retrieved). Then, 2 is subtracted from the length of the routing information, and the 2-bit value is checked. Reducing the length of the routing information is changing the length of the significant portion in the routing information. Normally, 2 is subtracted from the value indicating the length of the significant routing information written in the packet, and the result is rewritten to the packet. Therefore, the leading 2-bit value of 00 indicates that port 1 is the output port. The 2-bit value of 10 indicates that port 2 is the output port, Otherwise, that is, if the 2-bit value is 11, port 3 refers to the output port. If the length of the routing information is not larger than 0, that is, if all routing information has been removed, then the packet is transmitted to the active node as if the packet has arrived at the active node as the destination node. The packet is, for example, provided for a processor connected to the active node.

According to the second embodiment, a packet is prevented from being output to the output port from which the packet has been transmitted through the relay node so that the amount of the routing information can be further reduced. For example, assuming that the point of transmitting a packet to the right or left output port viewed from the point from which the packet has been transmitted is represented by 1 bit, that is, 0 or 1, the route from, for example in FIG. 4, the node P-c-1 to the node Q-c-0, can be represented by 6 bits 010001, thereby reducing the amount of routing information. However, since the sending node P-c-1 has never received a packet, 01 is used as 2-bit routing information as described later. The route from the node P-c-1 to the node Q-c-0 can be optionally changed into, for example, 0101100. Thus, if the packet is prevented from being output in the reverse direction of the transmission of the packet, the number of bits of the routing information required to pass a single node is calculated by the following equation (2).

$$\text{Number of Bits in Routing Information} = \log_2 (N-1) \text{ (decimal places are carried)} \quad (2)$$

Since no packet has been transmitted, the number of output ports that can output packets can be larger by a factor of one. For example, if packets can be output in 3 directions, the routing information can be represented by 2 bits.

FIG. 31 shows the procedure for determining an output port when the routing information is to be reduced. FIG. 31 shows the packet output port determining processes (a) through (c) in which packets are input through three input ports 0, 1, and 2 in a single node.

When a packet is input through any input port, the leading one bit is retrieved if the length of the routing information is larger than 0, and a packet output port is determined according to a 1-bit value which is obtained by subtracting 1 from the length of the routing information. When the packet is input from the input port 0, the output port 2 is determined when the 1-bit value is 0, and the output port 1 is determined when the value is 1. When the packet is input through the input port 1, the output port 0 is determined if the 1-bit value is 0, and the output port 2 is determined if the value is 1. When the packet is input through the input port 2, the output port 1 is determined if the 1-bit value is 0, and the output port 0 is determined if the value is 1. When a packet is received at any input port, the packet is accepted by the active node as if it has arrived at its destination node, if the length of the routing information is 0.

Described below is the third embodiment according to the present invention. According to the third embodiment, packets are output from input ports, which are assigned priority levels in order from the highest priority level, if the packets are simultaneously input from a plurality of input ports and are to be output from one output port.

For example, in FIG. 4, when packets are simultaneously input from the nodes P-a-0, P-a-1, and P-a-2 to the node P-a-3 to be output to the node P-b-0, the node P-a-3 outputs a packet in order from the input port having the highest priority level to the node P-b-0. In this case, each input port outputs a packet output port request signal to an output port assigning circuit 60 shown in FIG. 32.

The output port assigning circuit 60 outputs a request acceptance signal to an input port to connect the input port with an output port when the output port requested by the input port is not busy and has not been requested by an input port having a higher priority level. If an input port having a higher priority level than the input port outputs a request signal for the output port, a request acceptance signal is returned to an input port having a higher priority level. The packet input to the input port is in the wait state for output until the request acceptance signal arrives.

If the priority levels of input ports are fixed, only the packets from specific input ports are output from nodes by priority, resulting in biased network processes. Therefore, according to the third embodiment, a higher priority level is assigned to a longer waiting input packet. Assuming that one node has N input ports to be assigned priority levels, N! variations of states can be realized for the priority levels for the inputs according to the third embodiment.

Figure 33:
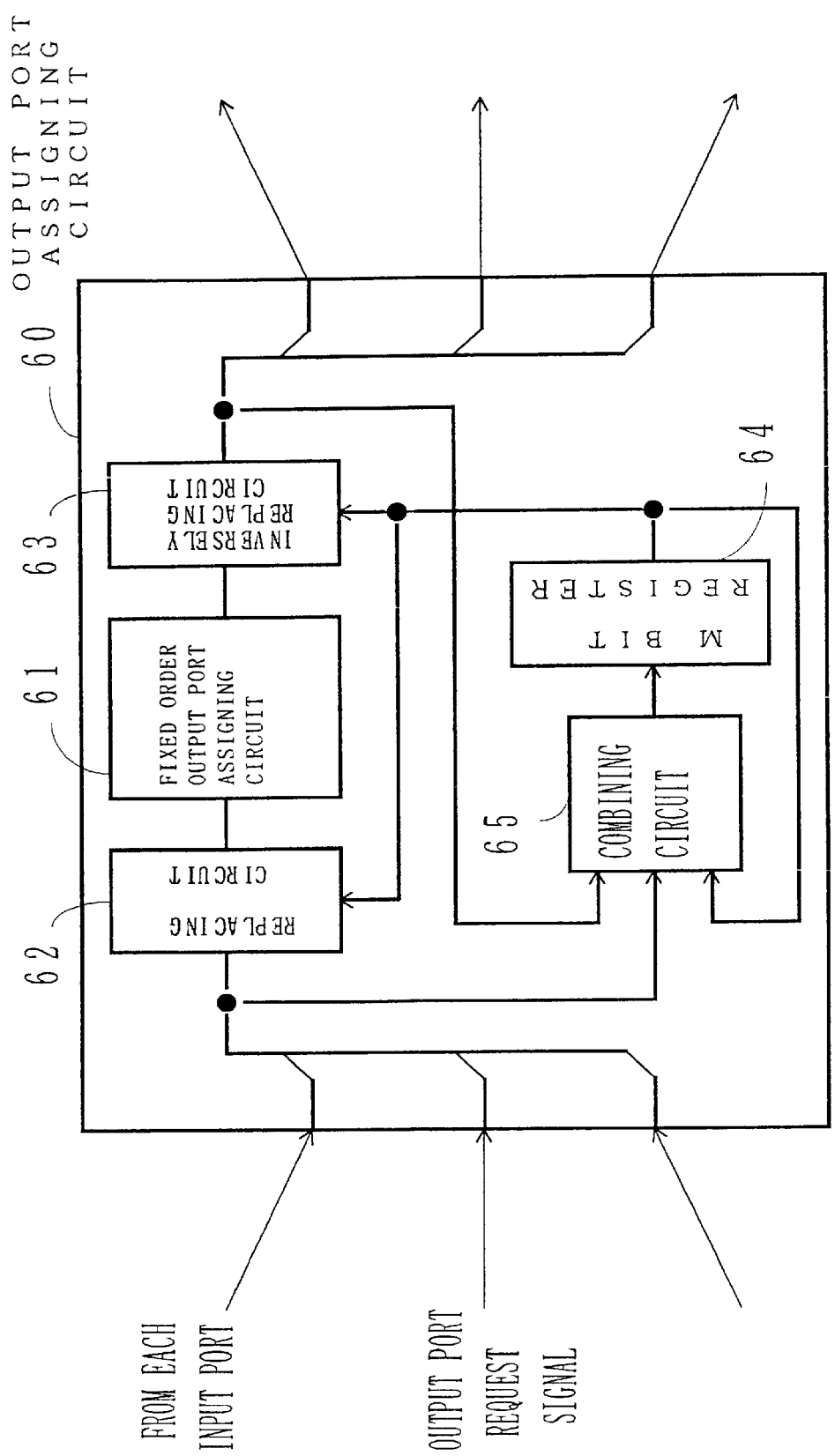
FIG. 33 is a block diagram showing the detailed configuration of the output port assigning circuit.

FIG. 33 is a block diagram showing the detailed configuration of the output port assigning circuit 60 according to the third embodiment of the present invention. In FIG. 33, the output port assigning circuit 60 comprises a fixed order output port assigning circuit 61; replacing circuit 62; inversely replacing circuit 63; M-bit register 64; and combining circuit 65. The fixed order output port assigning circuit 61 fixes an output port assignment priority level to each input port. The replacing circuit 62 switches the connection state of the output port request signal line from each input port to the fixed order output port assigning circuit 61. The inversely replacing circuit 63 restores the connection state between the output of the fixed order output port assigning circuit 61 and the request acceptance signal line to each input port to the original state before the connection state switched by the replacing circuit 62. The M-bit register 64 instructs the replacing circuit 62 and inversely replacing circuit 63 to change the connection state. The combining circuit 65 provides the M-bit register 64 with the state when a priority level change instruction is issued. The above described N! priority level states are set as the contents of the M-bit register 64, and the number M of bits is calculated by the following equation (3).

$$M = \log_2 (N!) \text{ (decimal places are carried)} \quad (3)$$

The contents of the M-bit register 64 are generated by the combining circuit 65 based on the current priority levels and the information about the input ports from which packets are kept waiting. The priority level of the input port from which a packet is kept waiting is set higher than those of other input ports. Between the input ports whose packets are simultaneously input and kept waiting for output, the current priority levels are maintained. Thus, the priority levels can be set such that a packet which is kept waiting for the longer time can be assigned the higher priority level. On the other hand, the priority levels of the input ports can be set equal in the output port assigning circuit by setting fixed contents of the M-bit register 64.

Figure 34:
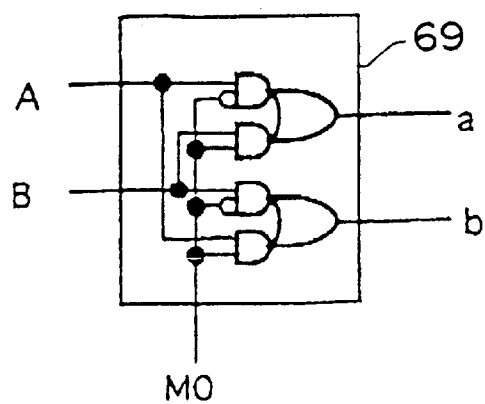
FIG. 34 shows the configuration of the 2-input-1bit replacing circuit 69 forming part of the replacing circuit 62 or inversely replacing circuit 63 shown in FIG. 33.

FIG. 34 shows the configuration of a 2-input-1bit replacing circuit 69 forming part of the replacing circuit 62 or inversely replacing circuit 63 shown in FIG. 33.

FIGS. 35, 36, and 37 show examples of a 2-input-1bit replacing circuit, a 3-input-1-bit replacing circuit, and a 4-input-1bit replacing circuit using the above described 2-input-1bit replacing circuit 69, and the operations of these circuits.

Figures 35A, 35B:
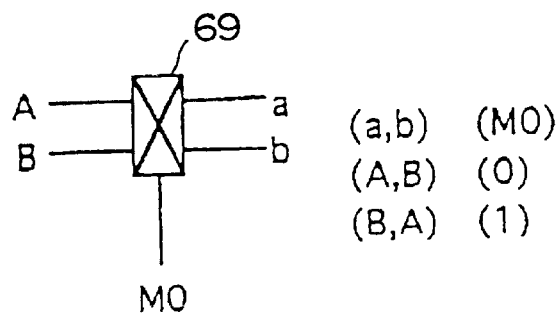
FIGS. 35A and B show an example and the operations of the 2-input-1bit replacing circuit using the above described 2-input-1bit replacing circuit 69.

For example, the 2-input-1-bit replacing circuit inverts and outputs an input data when M0 is 1 as shown in FIG. 35B.

Figures 36A, 36B:
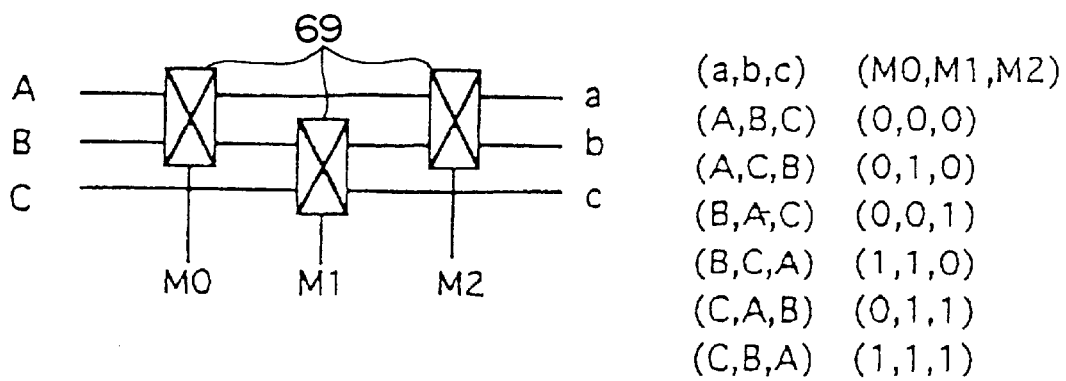
FIGS. 36A and B show an example and the operations of the 3-input-1bit replacing circuit using the above described 2-input-1bit replacing circuit 69.

Similarly, the 3-input-1-bit replacing circuit processes M0, M1, and M2 as shown in FIG. 36B to output data in order of 3! variations.

Figures 37A, 37B:
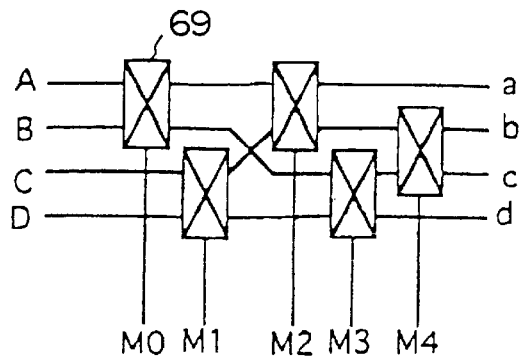
FIGS. 37A and B show an example and the operations of the 4-input-1bit replacing circuit using the above described 2-input-1bit replacing circuit 69.

Similarly, the 4-input-1bit replacing circuit rearranges the data to output them in order of 4! variations as shown in FIG. 37B.

The replacing circuit 62 shown in FIG. 33 receives from each input port a request signal of the width corresponding to the number of output ports. The replacing circuit can be designed for the necessary number of bits by providing a necessary number of the 2-input-1-bit replacing circuits 69.

The inversely replacing circuit 63 restores the data to the original order by inverting right to left the configuration shown in FIGS. 35 through 37, inputting the data from a, b, c, and outputting them to A, B, C, and D in the reverse order.

Figure 38:
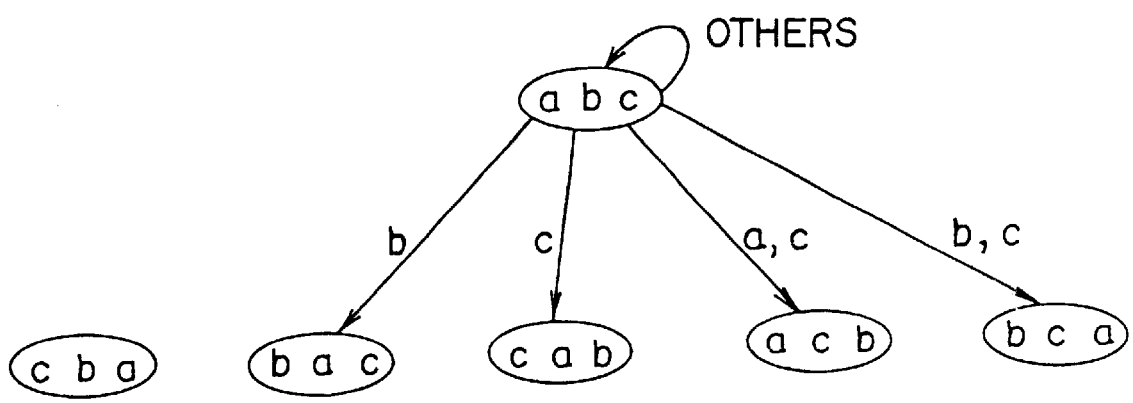
FIG. 38 shows the state transition of the priority levels through the combination circuit 65.

FIG. 38 shows the state transition of the priority levels through the combining circuit 65. In FIG. 38, a single node is provided with three input ports a, b, and c. In the initial state, port a is assigned the highest priority level followed by port b and port c in this order.

Assuming that the priority level of the input port whose packet is kept waiting for output is set higher and that the priority levels between the input ports whose packets are kept waiting equally are maintained, the priority levels are set in order of b, a, and c when a packet from the input port b is kept waiting, in order of c, a, and b when a packet from the input port c is kept waiting, in order of a, c, and b when packets from the input ports a and c are kept waiting, and in order of b, c, and a when packets from the input ports b and c are kept waiting. Thus, altering the priority levels of the initial state a, b, and c sets the priority level higher of the input port whose packet is kept waiting for output. In this case, the priority level of the input port whose packet is not kept waiting for output can remain unchanged or be assigned a predetermined priority.

Figure 39:
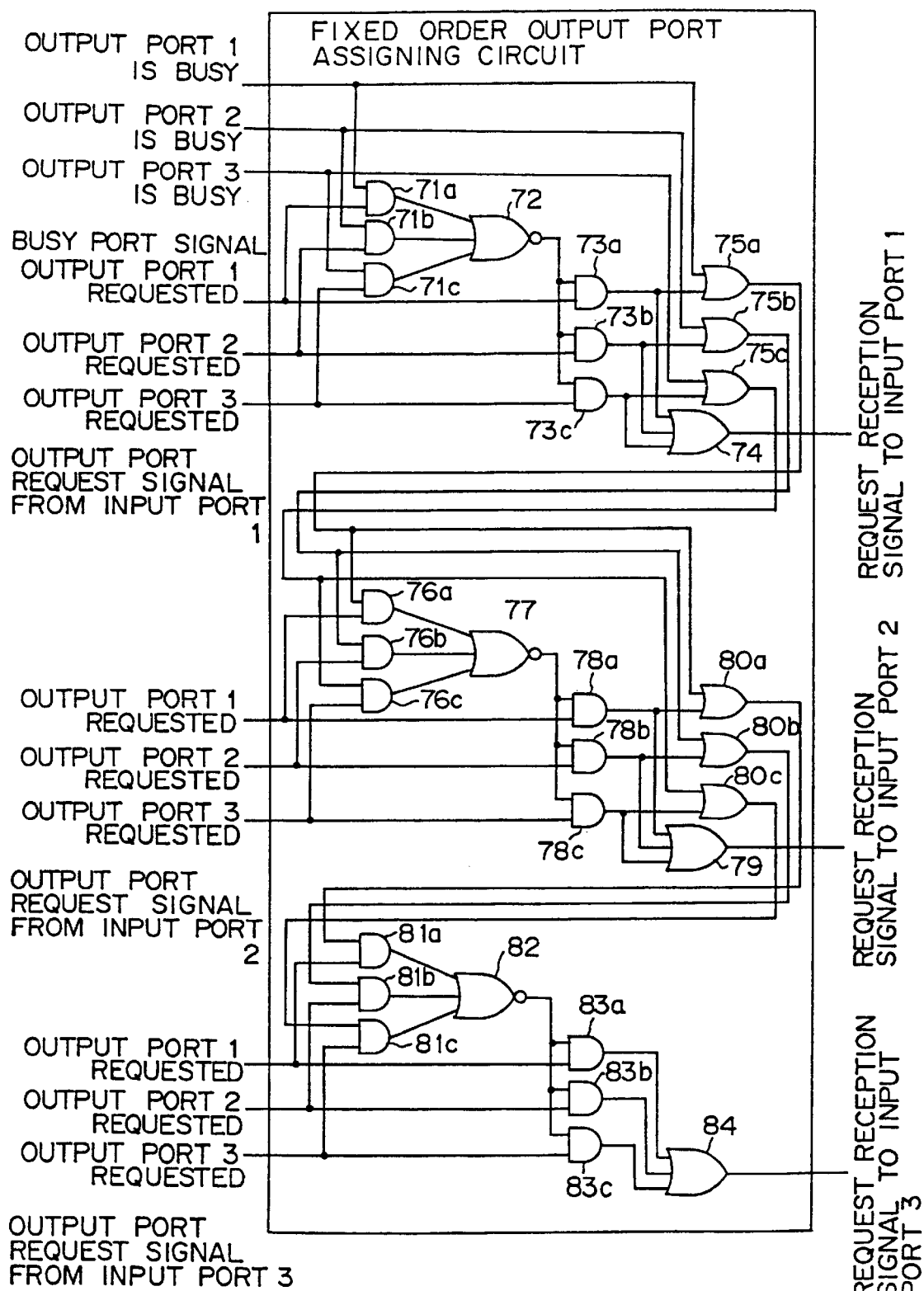
FIG. 39 shows the detailed configuration circuit of the fixed order output port assigning circuit 61 shown in FIG. 33.

FIG. 39 shows the detailed configuration of the fixed order output port assigning circuit 61 shown in FIG. 33. In FIG. 39, the priority level of the input port 1 is the highest, followed by the input port 2 as the second and the input port 3 as the third.

In FIG. 39, the top circuit corresponding to the input port 1 comprises three AND gates 71a through 71c; NOR gate 72; three AND gates 73a through 73c; OR gate 74; and three OR gates 75a through 75c. For example, if only a request signal of the output port 1 is output from the input port 1, the output of the AND gate 71a is 0 and the output of the NOR gate 72 is 1 unless the output port 1 busy signal is 1. Therefore, the output of the AND gate 73 is 1 and a request acceptance signal is output to the input port 1 through the OR gate 74.

Simultaneously, if 1 is output to an AND gate 76a forming part of the circuit corresponding to the input port 2 through the OR gate 75a and the output port 1 request signal from the input port 2 is 1, then the output of the AND gate 76a is 1 and the output of the NOR gate 77 is 0. Therefore, the output of an AND gate 78a is not 1 and no request acceptance signal is output to the input port 2, even if the output port 1 request signal is received at the input port 2.

Similarly, the priority levels for the request signal from the input port 1 to each output port is the highest followed by the request signal from the input port 2 and the input port 3.

As described above, the amount of destination information for the packet to be stored by the node forming part of the network can be reduced according to the first embodiment of the present invention. When broadcast data is transferred, the efficiency of data transfer can be improved without adding routing data to a packet. According to the second embodiment, a packet can be transferred through an optional route in an irregularly structured network without storing packet routing data in a node. Furthermore, according to the third embodiment, the priority level of an output of a packet which is kept waiting for a long time can be set higher, thereby effectively distributing the load in the network.

What is claimed is:

1. The node grouping in a network comprising a plurality of nodes, comprising:

classifying the nodes forming the network into a plurality of highest order hierarchical groups in a format communicable through the nodes within a group;

classifying the nodes forming a highest order hierarchical group into a plurality of second-highest order hierarchical groups in a format communicable through the nodes within a group;

classifying repeatedly in a third or lower order hierarchical group the nodes in a higher order hierarchical group into a plurality of lower order hierarchical groups one level lower than the higher order hierarchical group in a format communicable through the nodes within a group;

adding a hierarchical address to each node forming part of the network corresponding to each hierarchical group to which the node belongs;

adding an address of a transfer data sending node to data to be transferred to a plurality of destination nodes in the network;

logically disconnecting said network so that the network is arranged in a tree form with the sending node set as a root; and sending said transfer data to the plurality of destination nodes through a disconnected network, thereby realizing broadcast data transfer without sending double the transfer data to a same node and without copying the transfer data up to a branch point.

2. The node grouping method according to claim 1, wherein each node in the network has, as routing data for use in determining a communications route to a destination node in the network, routing data indicating a direction to each of the highest order hierarchical groups at the address which is different from the highest order hierarchical group of an active node, and a highest order hierarchical address identical to the highest order hierarchical address of an active node;

routing data indicating a direction to each of the second-highest order groups having different second-highest order hierarchical addresses from that of the active node;

routing data in an identical format among hierarchical groups from a group one level lower than the second highest order hierarchical group to a group one level higher than a lowest order hierarchical group; and routing data indicating a direction to each node other than the active node in a group to which the active node belongs in the lowest order hierarchical group.

3. The node grouping method according to claim 1, wherein each node in the network has, as routing data for use in determining a communications route to a destination node in the network, routing data indicating a direction to each of the highest order hierarchical groups at the address which is different from the highest order hierarchical group of an active node, and a highest order hierarchical address identical to the highest order hierarchical address of an active node;

routing data indicating a direction to each of the second-highest order groups having different second-highest order hierarchical addresses from that of the active node;

routing data in an identical format among hierarchical groups from a group one level lower than the second highest order hierarchical group to a group one level higher than a lowest order hierarchical group; and routing data indicating a direction to each node other than the active node in a group to which the active node belongs in the lowest order hierarchical group, whereby an output direction is determined according to stored routing data.

4. The node grouping method according to claim 1 further comprising:

adding disconnection marks to all ports of all nodes in the network;

referring to any node in the network as a sending node of the transfer data;

removing the disconnection marks from the ports on a communications route, determined according to predetermined distribution information from the sending node to all other nodes in the network, when the transfer data is transmitted through the communications route;

regarding a port still carrying the disconnection mark after removal of the disconnection marks as port disconnection information for each node corresponding to the sending node; and repeating above listed processes when all nodes in the network are sending nodes, and generating the port disconnection information of each node as logically analyzed disconnection data obtained when the all nodes in the network are sending nodes.

5. The node grouping method according to claim 1, wherein each node forming part of the network stores as the logically analyzed disconnection data:

disconnection point data for a port of an active node corresponding to each group when any node in each of the highest order hierarchical groups at the address other than the highest order hierarchical group to which the active node belongs is a sending node;

disconnection point data for the port of the active node corresponding to each group when any node in a same highest order hierarchical group at the address as the active node and in a second-highest order hierarchical group different from that of the active node is a sending node;

disconnection point data for the port of the active node corresponding to each group when any node having a same higher order hierarchical address as the active node and a lower order hierarchical address directly under the higher order hierarchical address different from that of the active node in each lower order hierarchical group is a sending node; and disconnection point data for the port of the active node corresponding to each group when each node other than the active node in the group to which the active node is a sending node in a lowest order hierarchical group.

6. The node grouping method according to claim 5, wherein said disconnection point data when any node in each of the highest order hierarchical groups at the address other than the highest order hierarchical group to which the active node belongs is a sending node is generated by:

referring to any node in a group in the highest order hierarchical groups as a sending node;

adding disconnection marks to all ports of all nodes except the nodes in the group to which the sending node belongs in the network;

removing the disconnection marks from the port on a communications route when transfer data is transmitted by the sending node through the communications route to each node at the ports provided with the disconnection marks, said route being determined according to distribution information predetermined by the sending node; and regarding the ports still carrying the disconnection marks even after the disconnection marks are removed as port disconnection information for each sending node; and repeatedly performing above listed steps for each highest order hierarchical group.

7. The node grouping method according to claim 5, wherein said disconnection point data when any node having a same higher order hierarchical address as the active node and a lower order hierarchical address directly under the higher order hierarchical address different from that of the active node in each lower order hierarchical group is a sending node is generated by:

referring to any node in a group in the lower order hierarchical groups as a sending node;

adding disconnection marks to all ports of all nodes in the lower order hierarchical groups except the nodes in the group to which the sending node belongs;

removing the disconnection marks from the port on a communications route when transfer data is transmitted by the sending node through the communications route to each node at the ports provided with the disconnection marks, said route being determined according to distribution information predetermined by the sending node, regarding the ports still carrying the disconnection marks even after the disconnection marks are removed as port disconnection information for each sending node;

repeatedly performing above listed steps for each of the lower order hierarchical groups; and further repeatedly performing said steps for all groups from a group one level higher than the lower order hierarchical groups to a group immediately below the highest order hierarchical group.

8. The node grouping method according to claim 5, wherein said disconnection point data when each node other than the active node in the group to which the active node is a sending node in a lowest order hierarchical group is generated by:

referring to any node in a group in the lowest order hierarchical groups as a sending node;

adding disconnection marks to all ports of all nodes except the sending node in the group to which the sending node belongs;

removing the disconnection marks from the port on a communications route when transfer data is transmitted by the sending node through the communications route to each node at the ports provided with the disconnection marks, said route being determined according to distribution information predetermined by the sending node, and regarding the ports still carrying the disconnection marks even after the disconnection marks are removed as port disconnection information for each sending node;

repeatedly performing above listed steps when all nodes in the group are sending nodes; and further repeatedly performing said steps for all groups from a group one level higher than the lower order hierarchical groups to a group immediately below the highest order hierarchical group.

9. The node grouping method according to claim 5, wherein said disconnection point data is generated by:

referring to any node in a group in object hierarchical groups at levels lower than the highest order hierarchical groups as a sending node;

adding disconnection marks to all ports of all nodes in each of the object hierarchical groups except the nodes in the group to which the sending node belongs;

removing the disconnection marks from the port on a communications route when transfer data is transmitted by the sending node through the communications route to each node at the ports provided with the disconnection marks, said route being determined according to distribution information predetermined by the sending node; and regarding the ports still carrying the disconnection marks even after the disconnection marks are removed as port disconnection information for each sending node;

repeatedly performing the above listed steps for each and all of the object hierarchical groups.

10. A network data transfer method in a network comprising a plurality of nodes each including a processor, said method comprising:

adding routing information to a destination node of transfer data by a transfer data sending node in the network;

when the transfer data passes a relay node having N output ports, determining an output port from the relay node according to $\log_2 N$ bits (decimal places are carried) in added routing information and removing the $\log_2$ N-bit information from the routing information; and receiving by a node the transfer data with all of the routing information removed, the node being a destination node, and providing the transfer data from the node to a processor connected to the node, thereby data is transferred in the network having an irregular topology without storing routing data for the transfer data in a node in the network, wherein said $\log_2$ N-bit information determining the output port can be reduced to $\log_2 (N-1)$ bit (decimal places are carried) by preventing the relay node having the N output ports from outputting the transfer data in an input direction of the transfer data of the node, wherein N is defined as the number of output ports excluding a port connected to the processor.

11. A network comprising a plurality of nodes, each node comprising:

a port disconnection data selecting unit selecting, from all port disconnection data for active node according to an address of the sending node, port disconnection data for an active node determined by a sending node of transfer data sent from an external unit;

a destination determining unit determining which hierarchical order node is referred to by the address of the transfer data when receiving an address of the active node and a destination node address of the transfer data;

a specific hierarchical destination determining unit outputting output port designation data when the destination node of the transfer data belongs to a specific hierarchical node and when specific hierarchical destination output port data indicating the output port of the transfer data from the active node and data indicating a specific hierarchical destination at transfer data destination addresses are received;

an output port designation selecting unit selecting any piece of output port designation data output by said specific hierarchical destination determining unit according to a determination result of said destination determining; and an output port determining unit determining, as an output port for transfer data from the active node according to outputs of said output port designation data selecting unit and of said port disconnection data selecting unit, the output port specified by selected output port designation data and not disconnected.

12. A network comprising a plurality of nodes, each node comprising:

a sending node determining unit determining for each hierarchical group whether the sending node belongs to a group to which the active node belongs after receiving an address of a sending node of transfer data input externally and an address of an active node;

a disconnection data selecting unit selecting corresponding to a determination result from said sending node determining unit and the address of the sending node, as port disconnection data of the active node for the transfer data, one of the port disconnection data of the active node determined by the relationship between hierarchical order groups of the sending node and the group to which the active node belongs;

a destination determining unit determining which node is referred to by a transfer data destination, a node in a prefecture other than one to which the active node belongs, a node in a city other than one to which the active node belongs, or a node in a city to which the active node belongs;

a specific hierarchical destination determining unit outputting output port designation data when the destination node of the transfer data belongs to a specific hierarchical node and when specific hierarchical destination output port data indicating the output port of the transfer data from the active node and data indicating a specific hierarchical destination at transfer data destination addresses are received;

an output port designation data selecting unit selecting any piece of output port designation data output by said specific hierarchical destination determining unit according to a determination result of said destination determining unit; and an output port determining unit determining, as an output port for transfer data from the active node according to outputs of said output port designation data selecting unit and of said port disconnection data selecting unit, the output port specified by selected output port designation data and not disconnected.

13. A network node comprising a plurality of nodes, each node comprising:

a $\log_2$ (N!)=M bit state register (decimal places are carried) storing data corresponding to one of N! priority levels for input from N input ports, said data being stored for use in determining depending on a wait state of an output of a plurality of data, priority levels for output of a plurality of transfer data inputs through a plurality of input ports of an active node and to be output simultaneously from a same output port;

a fixed order output port assigning circuit receiving a transfer data output request from said plurality of input ports and outputting a request acceptance signal to each input port with priority levels fixed for the output ports through which the transfer data are output;

a replacing circuit altering a connection state of an input signal line of a transfer data output request signal to said fixed priority level output port assigning circuit according to stored contents of said state register; and an inversely replacing circuit outputting an output of said fixed order output port assigning circuit as the request acceptance signal after restoring the output to a connection state before alteration by said replacing circuit, wherein N is defined as the number of input ports.

14. A network comprising a plurality of nodes, each node comprising:

port disconnection data selecting means for selecting, from all port disconnection data for active node according to an address of the sending node, port disconnection data for an active node determined by a sending node of transfer data sent from an external unit;

destination determining means for determining which hierarchical order node is referred to by the address of the transfer data when receiving an address of the active node and a destination node address of the transfer data;

specific hierarchical destination determining means for outputting output port designation data when the destination node of the transfer data belongs to a specific hierarchical node and when specific hierarchical destination output port data indicating the output port of the transfer data from the active node and data indicating a specific hierarchical destination at transfer data destination addresses are received;

output port designation selecting means for selecting any piece of output port designation data output by said specific hierarchical destination determining means according to a determination result of said destination determining means; and output port determining means for determining, as an output port for transfer data from the active node according to outputs of said output port designation data selecting means and of said port disconnection data selecting means, the output port specified by selected output port designation data and not disconnected.

* * * * *